US012522844B2

(12) United States Patent
Nolden et al.

(10) Patent No.: US 12,522,844 B2
(45) Date of Patent: Jan. 13, 2026

(54) VSV CHIMERIC VECTORS

(71) Applicants: Vira Therapeutics GmbH, Rum (AT); Boehringer Ingelheim International GmbH, Ingelheim am Rhein (DE)

(72) Inventors: Tobias Nolden, Innsbruck (AT); Patrik Erlmann, Innsbruck (AT); Guido Wollmann, Innsbruck (AT); Zoltan Banki, Innsbruck (AT); Bart Spiesschaert, Innsbruck (AT); Janine Kimpel, Innsbruck (AT); Dorothee Von Laer, Innsbruck (AT)

(73) Assignees: Vira Therapeutics GmbH, Rum (AT); Boehringer Ingelheim International GmbH, Ingelheim am Rhein (DE)

( * ) Notice: Subject to any disclaimer, the term of this patent is extended or adjusted under 35 U.S.C. 154(b) by 1187 days.

(21) Appl. No.: 17/295,835

(22) PCT Filed: Nov. 22, 2019

(86) PCT No.: PCT/EP2019/082328
§ 371 (c)(1),
(2) Date: May 20, 2021

(87) PCT Pub. No.: WO2020/104694
PCT Pub. Date: May 28, 2020

(65) Prior Publication Data
US 2022/0010334 A1    Jan. 13, 2022

(30) Foreign Application Priority Data
Nov. 23, 2018   (EP) ..................... 18208074

(51) Int. Cl.
*C12N 15/86* (2006.01)
*A61K 35/766* (2015.01)
*A61P 35/00* (2006.01)

(52) U.S. Cl.
CPC ............ *C12N 15/86* (2013.01); *A61K 35/766* (2013.01); *A61P 35/00* (2018.01); *C12N 2760/10022* (2013.01); *C12N 2760/20232* (2013.01); *C12N 2760/20244* (2013.01)

(58) Field of Classification Search
None
See application file for complete search history.

(56) References Cited

FOREIGN PATENT DOCUMENTS

| WO | WO 2010/040526 | | 4/2010 | |
|---|---|---|---|---|
| WO | WO-2010040526 | A1 * | 4/2010 | ........... A61K 35/766 |
| WO | WO 2015/077714 | | 5/2015 | |
| WO | WO-2015077714 | A1 * | 5/2015 | ............. A61K 35/12 |
| WO | WO 2017/120670 | | 7/2017 | |
| WO | WO 2017/197525 | | 11/2017 | |

OTHER PUBLICATIONS

Palacios, et al. N Engl J Med. Mar. 6, 2008;358(10):991-8. doi: 10.1056/NEJMoa073785. Epub Feb. 6, 2008. (Year: 2008).*
GenBank accession EU136038 (Dandenong virus isolate 0710-2678 segment S glycoprotein (GPC) and nucleoprotein (NP) genes, complete cds; Date: Mar. 4, 2008)(Year: 2008).*
Extended European Search report issued in European Application No. 18208074.7, mailed Mar. 4, 2019.
Muik et al., "Re-engineering Vesicular Stomatitis Virus to Abrogate Neurotoxicity, Circumvent Humoral Immunity, and Enhance Oncolytic Potency," *Cancer Research*, 74(13):3567-3578, 2014.
PCT International Preliminary Report on Patentability issued in International Application No. PCT/EP2019/082328, mailed Jun. 3, 2021.
PCT International Search Report and Written Opinion issued in International Application No. PCT/EP2019/082328, mailed Jan. 20, 2020.
Shen et al., "Immunovirotherapy with vesicular stomatitis virus and PD-L1 blockade enhances therapeutic outcome in murine acute myeloid leukemia," *Blood*, 127(11):1449-1458, 2016.

* cited by examiner

*Primary Examiner* — Benjamin P Blumel
*Assistant Examiner* — Jeffrey Mark Sifford
(74) *Attorney, Agent, or Firm* — pH IP Law

(57) ABSTRACT

The present invention relates to VSV chimeric vectors, characterized in that the vectors comprise a gene coding for a glycoprotein GP of the Dandenong virus (DANDV) or Mopeia virus (MOPV) and lack a functional gene coding for envelope protein G of the VSV. The invention also provides VSV chimeric vector systems. In addition, the invention relates to uses of the VSV chimeric vectors and systems of the invention, including the use in medicine such as in the treatment of solid tumors.

3 Claims, 13 Drawing Sheets

Specification includes a Sequence Listing.

Sequence comparison of Old world Arenavirus (A) and New World Arenavirus clade C (B) glycoproteins

| Virus Species | Acronym | Strain/Isolate | GeneBank accession no. | Length GPC(aa) | N-linked Glycosylation | | pairwise sequence comparison to LCMV WE HPI | | | | | Ref. |
|---|---|---|---|---|---|---|---|---|---|---|---|---|
| | | | | | | | aa | | | nt | | |
| | | | | | n | Position within aa sequence | % Seq Id. | n | Similarity | % Seq Id. | n | |
| (A) | | | | | | | | | | | | |
| Lymphocytic chorio-meningitis virus | LCMV | WE-HPI | AJ297484 | 498 | 6 | 85, 95, 114, 124, 171, 232 | - | - | - | - | - | [1] |
| Mopeia virus | MOPV | AN 21366-BNI | JN561684 | 489 | 7 | 78, 88, 98, 106, 118, 166, 222 | 56% | 283 | 73.5% | 59% | 907 | [2] |
| Dandenong virus | DANDV | 0710-2678 | EU136038 | 498 | 7 | 80, 85, 95, 114, 124, 171, 232 | 91% | 455 | 97.0% | 77% | 1162 | [3] |
| Ippy virus | IPPYV | Dak An B 188 d | DQ328877 | 495 | 10 | 66, 78, 88, 97, 107, 117, 159, 165, 197, 228 | 57% | 292 | 74.6% | 61% | 946 | [4] |
| (B) | | | | | | | | | | | | |
| Olivero | OLVV | 3229-1 | U34248 | 518 | 9 | 75, 90, 101, 112, 117, 131, 180, 234, 251 | 40% | 216 | 59.0% | 53% | 884 | [5] |
| Latino | LATV | MARU 10924 | AF485259 | 515 | 10 | 75, 90, 101, 112, 117, 131, 138, 180, 234, 251 | 41% | 216 | 59.1% | 52% | 861 | [6] |

Fig. 2 (Cont.)

Pairwise comparison of Nucleotide and aminoacid sequence identity.

| Virus | Nucleotide sequence identity (%) | | | | | |
|---|---|---|---|---|---|---|
|  | LCMV | DANDV | IPPYV | MOPV | OLIVV | LATV |
| LCMV | — | 77,47 | 59,04 | 58,63 | 49,72 | 49,00 |
| DANDV | 91,18 | — | 58,75 | 59,95 | 51,09 | 50,31 |
| IPPYV | 58,05 | 59,64 | — | 66,16 | 49,15 | 49,81 |
| MOPV | 56,57 | 56,97 | 71,43 | — | 50,79 | 49,68 |
| OLIVV | 41,14 | 41,71 | 41,35 | 42,31 | — | 71,48 |
| LATV | 40,23 | 41,00 | 41,39 | 42,36 | 79,00 | — |
| Amino acid sequence identity (%) | | | | | | |

Cytopathic Effects induced by VSV*$M_{cp}\Delta G$ G(x) complemented Virus in BHK21Cl.13

| Dilution | trans-complemented GP of | | | | | |
|---|---|---|---|---|---|---|
| | mock | DANDV | IPPYV | MOPV | OLIVV | LATV |
| neat | - | ++ | - | ++ | ++++ | ++ |
| 1:10 | - | + | - | + | +++ | - |
| 1:100 | - | - | - | - | + | - |
| 1:1000 | - | - | - | - | -(+) | - |

B

Cytopathic Effects induced by VSV*$M_{cp}\Delta G$ G(x) complemented Virus in BHK-566

| Dilution | trans-complemented GP of | | | | | |
|---|---|---|---|---|---|---|
| | mock | DANDV | IPPYV | MOPV | OLIVV | LATV |
| neat | +++ | +++ | +++ | +++ | ++++ | +++ |
| 1:10 | -(+) | +++ | -(+) | +++ | ++++ | +++ |
| 1:100 | -(+) | +++ | -(+) | +++ | ++++ | +++ |
| 1:1000 | - | ++ | - | ++ | +++ | ++ |

Scoring of virus induced neurotoxicity in mice

| General observations | | | | Additional observations | | | | | | | | |
|---|---|---|---|---|---|---|---|---|---|---|---|---|
| | | | | Body condition | | Provoked behavior | | Motility | | Respiration | | |
| General appearance | Score | Clinical observations | Score | Categories | Score | Categories | Score | Categories | Score | Categories | Score |
| | no | yes | | no | yes | | | | | | | |
| lack of grooming | 0 | 1 | | | | well conditioned | 0 | normal grasp reflex | 0 | normal | 0 | normal respiration | 0 |
| inflamed eyes | 0 | 1 | signs of deterioration | 0 | 1 | underconditioned | 1 | slightly reduced | 1 | slightly reduced | 1 | slightly abnormal respiration | 1 |
| disorganised fur | 0 | 1 | no coordination | 0 | 1 | emaciated | 2 | strongly reduced | 2 | strongly reduced | 2 | increased rate with abdominal breathing | 2 |
| paralyzed legs | 0 | 1 | impaired locomotion | 0 | 1 | | | loss of grasp reflex | 3 | loss of motility | 3 | | |
| hunched position | 0 | 1 | | | | | | | | | | | |

VSV CHIMERIC VECTORS

The present application is a national phase application under 35 U.S.C. § 371 of International Application No. PCT/EP2019/082328, filed Nov. 22, 2019, which claims the priority benefit of European Application No. 18208074.7, filed Nov. 23, 2018, the entire contents of each of which are hereby incorporated by reference.

The present invention relates to VSV chimeric vectors, characterized in that the vectors comprise a gene coding for a glycoprotein GP of the Dandenong virus (DANDV) or Mopeia virus (MOPV) and lack a functional gene coding for envelope protein G of the VSV. The invention also provides VSV chimeric vector systems. In addition, the invention relates to uses of the VSV chimeric vectors and systems of the invention, including the use in medicine such as in the treatment of solid tumors.

DESCRIPTION OF THE PRIOR ART

The use of viruses in cancer therapy has been investigated intensively over the last decades. Oncolytic viruses (OVs) are considered as important agents in cancer treatment. The oncolytic viruses offer the attractive therapeutic combination of tumor-specific cell lysis together with immune stimulation. Moreover, OVs can be genetically modified for optimization of tumor selectivity and enhanced immune stimulation and can be readily combined with other agents such as checkpoint inhibitory antibody molecules and other immune therapeutics. The effectiveness of OVs has been demonstrated in many preclinical studies and recently in humans, with US Food and Drug Administration approval of the oncolytic herpesvirus talimogene laherparepvec [1, 2].

To date, a wide range of viruses with diverse properties are under preclinical and clinical investigation. Oncolytic viruses range in size and complexity from large, double-stranded DNA viruses such as vaccinia virus (190 kb) [3] and herpes simplex virus type 1 (152 kb) [4] to small single stranded RNA viruses such as vesicular stomatitis virus (VSV) [5,6], measles virus (MV) [7] or Newcastle disease virus (NDV) [8] with a genome size between 11 and 16 kb. However, every oncolytic virus platform has advantages and disadvantages. Clearly, a promising approach to oncolysis is to match different viruses with tumor types naturally permissive for their replication. On the other hand, the broad natural receptor tropism of some platforms, for example, vaccinia- and vesicular stomatitis virus-based vectors, allows application for many different types of cancer.

VSV-based vector platforms are considered as very promising virotherapy not only due to its broad receptor tropism but also because of its enormous capacity to replicate in permissive cells and its ability to induce a strong CPE causing local inflammation mounting an immune response within the infected tumor tissue. However, there are several drawbacks using wild type VSV in oncolytic virotherapy. First, wildtype VSV stains are considered to be neurotoxic. Wild type VSV can cause severe encephalitis leading to death if the virus accidentally crosses the blood-brain-barrier and spreads within the brain of the treated individual. Second, VSV infected individuals are able to rapidly mount a strong humoral response with high antibody titers directed mainly against the nucleo- and the glycoprotein. In addition to a strong CTL response with CD8+ cells specific to an epitope located within the nucleoprotein, neutralizing antibodies binding to the envelope glycoprotein G of VSV are considered to be important for the control of VSV infection. Neutralizing antibodies targeting the glycoprotein G of VSV are able to limit virus spread and they are able to mediate protection of individuals from VSV re-infection. Vector neutralization, however, limits repeated application of the oncolytic agent to the cancer patient.

To eliminate these drawbacks of VSV wildtype, a recombinant VSV vector named VSV-GP has been described in WO 2010/040526. In VSV-GP the coding region of the endogenous glycoprotein VSV-G, which is considered to be the main determinant for neurotoxicity and vector neutralization, was replaced by the envelope glycoprotein GP of lymphocytic choriomeningitis virus (LCMV), strain WE-HPI. Advantages offered by the replacement of VSV viral envelope protein G with LCMV-GP (WE HPI) are (i) the loss of VSV-G mediated neurotoxicity [9] and (ii) a lack of vector neutralization by antibodies in the mouse model only [10,11]. However, there is still a need for vectors with reduced induction of neutralizing antibodies and thus an improved suitability for use in therapy.

The technical problem to be solved by the present invention is thus the provision of improved VSV chimeric vectors and corresponding uses and methods. The technical problem is solved by the embodiments provided herein and as claimed.

SUMMARY OF THE INVENTION

The present invention provides VSV chimeric vectors, characterized in that the vectors comprise a gene coding for a glycoprotein GP of the Dandenong virus (DANDV) or Mopeia (MOPV) virus or a functional fragment or variant thereof and lack a functional gene coding for envelope protein G of the VSV. It is preferred within the present invention that the envelope protein G of VSV is replaced by GP of the DANDV or MOPV or a functional fragment or variant thereof. In an alternative embodiment of the invention, VSV chimeric vectors are provided, characterized in that the vectors comprise a gene coding for a glycoprotein GP of the Ippy virus (IPPYV), Latino virus (LATV) or Olivero virus (OLIVV) or a functional fragment or variant thereof and lack a functional gene coding for envelope protein G of the VSV.

In an attempt to improve the VSV-based OVs in the art, the inventors surprisingly found that a surface protein GP of DANDV or MOPV in a VSV vector leads to a chimeric vector which shows no or only low titers of neutralizing antibodies and maintains replicative capacity of the underlying VSV vector in tumor cells. In addition, both the tropism and the lack of neurotoxicity of the VSV-GP vector are preserved.

The inventors have thus surprisingly found that envelope protein GP of arenaviruses, in particular the DANDV and the MOPV, when used in the framework of VSV leads to recombinant vectors that do not show neurototoxicity after intra-cranial application in mice. At the same time, the chimeric VSV vectors surprisingly maintain cellular tropism of the VSV vector of the prior art. Much to the surprise of the inventors, improved killing of selected human tumor cell lines due to the virus induced cytopathic effect (CPE) could be shown when compared to VSV with GP of LCMV. This effect was confirmed in vivo, in particular the efficacy of VSV-G(x)-DANDV und VSV-G(x)-MOPV in a human lung cancer xenograft model was unexpectedly improved in comparison to VSV-LCMV-GP. Additionally, VSV-G(x)-DANDV und VSV-G(x)-MOPV showed a significantly delayed induction of vector-neutralizing antibodies in the rabbit model after intra-venous immunization.

Thus, in one embodiment, the invention relates to VSV chimeric vectors, characterized in that the vectors comprise a gene coding for a glycoprotein GP of the Dandenong virus (DANDV) or Mopeia virus (MOPV) and lack a functional gene coding for envelope protein G of the VSV, wherein the vectors show reduced induction of neutralizing antibodies as compared to a VSV vector pseudotyped with GP of LCMV under identical conditions. In a further embodiment of the invention, the vector comprises a gene coding for a glycoprotein GP of the Ippy, Olivero or Latino virus. A "neutralizing antibody" is an antibody that binds to an antigen and thereby prevents biological effects imparted by the antigen. Many antigens that are foreign to a host induce a reaction of the hosts' immune system including the production of neutralizing antibodies. The VSV chimeric vectors of the invention, however, are improved over known chimeric VSV vectors in that they only lead to a reduced induction of neutralizing antibodies, and may thus show improved biological effects on the targeted cells of the host. The skilled person is well aware of means and methods how to determine whether neutralizing antibodies are induced and to what extent. Thus, the skilled person can readily determine whether the VSV chimeric vectors of the invention induce neutralizing antibodies and whether the induction is reduced in comparison to a VSV chimeric vector pseudotyped with GP of LCMV. Such assays may provide a quantitative or qualitative result. For example, assays may provide an absolute measure of the neutralizing antibody induction ability which may then be compared to a pre-determined number for VSV chimeric vector pseudotyped with GP of LCMV. Additionally or alternatively, an assay may quantitatively provide the relative ability to induce neutralizing antibodies. An exemplary assay which may be employed within the present invention is provided in Example 5. As shown in FIG. 9, the results surprisingly and unexpectedly show that the vectors of the invention show significantly reduced induction of neutralizing antibodies. As such, an exemplary assay may comprise use of p-nitro-phenylphosphate (pNPP) in the determination of the presence of neutralizing antibodies that is added to serum samples from different time points post immunization. In the absence of nAbs, a GP-pseutotyped virus (LCMV-GP, DANDV-GP or MOPV-GP, respectively), that harbors the gene of the secreted embryonic alkaline phosphatase (SEAP) instead of the surface protein, is able to infected BHK21CI.13 cells resulting in the expression of SEAP. In contrast, if the virus is neutralized by antibodies in the sera, the virus was not able to infect the cells and hence SEAP is not expressed. Thus, nAb activity can be determined as a function of SEAP activity. By non-linear curve fitting EC50 values can be calculated.

In one embodiment of the invention, the improved biological effect may be an increased killing of tumor cells as compared to a VSV vector pseudotyped with GP of LCMV under identical conditions. Thus, the invention, in one embodiment relates to VSV chimeric vectors, characterized in that the vectors comprise a gene coding for a glycoprotein GP of the Dandenong (DANDV) virus or Mopeia (MOPV) virus and lack a functional gene coding for envelope protein G of the VSV, wherein the vectors show increased killing of tumor cells as compared to a VSV vector pseudotyped with GP of LCMV under identical conditions. The skilled person is well aware of means and methods how to determine whether tumor cells are killed and to what extent. Thus, the skilled person can readily determine whether the VSV chimeric vectors of the invention kill tumor cells and whether the killing is increased in comparison to a VSV chimeric vector that expresses GP of LCMV. Such assays may provide a quantitative or qualitative result. For example, assays may provide an absolute measure of the tumor cell killing ability which may then be compared to a pre-determined number for VSV chimeric vector that expresses GP of LCMV. Additionally or alternatively, an assay may quantitatively provide the relative ability to kill tumor cells. An exemplary assay is provided in Example 4. Such an assay may comprise the pre-incubation of cells to be infected with IFN and the subsequent infection with the VSV chimeric vectors of the invention and/or VSV-GP of LCMV. After incubation, e.g. for three days, cells may be analyzed for viability using an MTT (3-(4,5-dimethylthiazol-2-yl)-2,5-diphenyltetrazolium bromide)-based in vitro cytotoxicity assay, according to the manufacturer's recommendations. Samples can then be measured in a conventional microplate reader at 550 nm. Values can be normalized to mock-infected cells that were not pre-treated with interferon (IFN), and represented as a percentage of viable cells.

The Dandenong virus (DANDV) is an old world arenavirus [12]. To date, there is only a single strain known to the person skilled in the art, which comprise a glycoprotein GP and which may be employed within the present invention as donor of the GP comprised in the VSV chimeric vectors of the invention. The DANDV GP comprised in the VSV chimeric vectors of the invention has more than 6 glycosylation sites, in particular 7 glycosylation sites. An exemplary preferred GP is that as comprised in DANDV as accessible under Genbank number EU136038. Thus, in one embodiment, the gene coding for GP of the DANDV has a nucleic acid sequence as shown in SEQ ID NO:1 or a sequence having at least 80, 85, 90, 95, 96, 97, 98, 99 or 100% sequence identity to the nucleic acid sequence of SEQ ID NO:1 while the functional properties of the chimeric VSV vector comprising a GP encoded by a nucleic acid sequence as shown in SEQ ID NO:1 are maintained.

The Mopeia virus (MOPV) is an old world arenavirus [13]. There are several strains known to the person skilled in the art, which comprise a glycoprotein GP and which may be employed within the present invention as donor of the GP comprised in the VSV chimeric vectors of the invention. The MOPV GP comprised in the VSV chimeric vectors of the invention has more than 6 glycosylation sites, in particular 7 glycosylation sites. An exemplary preferred GP is that as comprised in Mopeia virus as accessible under Genbank number AY772170. Thus, in one embodiment, the gene coding for GP of the MOPV has a nucleic acid sequence as shown in SEQ ID NO:3 or a sequence having at least 60, 65, 70, 75, 80, 85, 90, 95, 96, 97, 98, 99 or 100% sequence identity to the nucleic acid sequence of SEQ ID NO:3 while the functional properties of the chimeric VSV vector comprising a GP encoded by a nucleic acid sequence as shown in SEQ ID NO:3 are maintained.

The Ippy virus (IPPYV) is an old world arenavirus that was first isolated from a wild caught rodent, *Arvicanthis* sp. [14]. There are several strains known to the person skilled in the art, which comprise a glycoprotein GP and which may be employed within the present invention as donor of the GP comprised in the VSV chimeric vectors of the invention. The IPPYV GP comprised in the VSV chimeric vectors of the invention has more than 6 glycosylation sites, preferably more than 8 glycosylation sites, in particular 10 glycosylation sites. An exemplary preferred GP is that as comprised in IPPYV as accessible under Genbank number DQ328877. Thus, in one embodiment, the gene coding for GP of the Ippy virus has a nucleic acid sequence as shown in SEQ ID NO:5 or a sequence having at least 60, 65, 70, 75, 80, 85, 90, 95, 96, 97, 98, 99 or 100% sequence identity to the nucleic acid sequence of SEQ ID NO:5 while the functional properties of the chimeric VSV vector comprising a GP encoded by a nucleic acid sequence as shown in SEQ ID NO:5 are maintained.

The Latino virus (LATV) is a new world arenavirus that was first isolated from an adult pregnant female *Calomys callosus* [15]. There are several strains known to the person skilled in the art, which comprise a glycoprotein GP and which may be employed within the present invention as donor of the GP comprised in the VSV chimeric vectors of the invention. The LATV GP comprised in the VSV chimeric vectors of the invention has more than 6 glycosylation sites, preferably more than 8 glycosylation sites, in particular 10 glycosylation sites. An exemplary preferred GP is that as comprised in LATV as accessible under Genbank number AF485259. Thus, in one embodiment, the gene coding for GP of the LATV has a nucleic acid sequence as shown in SEQ ID NO:7 or a sequence having at least 50, 55, 60, 65, 70, 75, 80, 85, 90, 95, 96, 97, 98, 99 or 100% sequence identity to the nucleic acid sequence of SEQ ID NO:7 while the functional properties of the chimeric VSV vector comprising a GP encoded by a nucleic acid sequence as shown in SEQ ID NO:7 are maintained.

The Olivero virus (OLIVV) is a new world arenavirus that was first isolated from the rodent *Bolomys obscures* [16]. There are several strains known to the person skilled in the art, which comprise a glycoprotein GP and which may be employed within the present invention as donor of the GP comprised in the VSV chimeric vectors of the invention. The OLIW GP comprised in the VSV chimeric vectors of the invention has more than 6 glycosylation sites, preferably more than 8 glycosylation sites, in particular 9 glycosylation sites. An exemplary preferred GP is that as comprised in OLIW as accessible under Genbank number U34248. Thus, in one embodiment, the gene coding for GP of the OLIW has a nucleic acid sequence as shown in SEQ ID NO:9 or a sequence having at least 50, 55, 60, 65, 70, 75, 80, 85, 90, 95, 96, 97, 98, 99 or 100% sequence identity to the nucleic acid sequence of SEQ ID NO:9 while the functional properties of the chimeric VSV vector comprising a GP encoded by a nucleic acid sequence as shown in SEQ ID NO:9 are maintained.

In view of the surprising and unexpected technical advantages of the VSV chimeric vectors of the invention described above and as shown in the appended examples, it is within the scope of the present invention to provide the vectors of the invention for medical uses and, thus, vectors specifically designed to be suitable for such uses. Thus, in one embodiment of the invention, the vectors of the invention are provided comprising at least one transgene. A "transgene" is a segment of DNA comprising a gene sequence that has been isolated from one organism and is introduced into a different organism. Within the present invention, the transgene or the transgenes comprised in the vectors of the invention may be of any origin and may have any biological effect on the targeted cells.

In a further embodiment, the invention relates to a VSV chimeric vector system, characterized in that the system comprises at least two complementary replicating VSV vectors, wherein the system comprises genes n, l, p and m coding for proteins N, L, P and M of the VSV, a gene gp coding for Dandenong-GP or Mopeia-GP and lacks a functional gene coding for G protein of the VSV, wherein each vector of the system lacks one of the genes n, l, p, m and gp, and wherein the lacking gene is present on any other vector of the system. The respective GP gene comprised in the VSV chimeric vector system of the invention is one of the genes encoding a GP protein as comprised in the VSV chimeric vector of the invention described above.

The invention, in a further embodiment, relates to chimeric VSV virions, characterized in that the virion comprises a GP protein of the Dandenong virus or Mopeia virus as envelope protein. In a further embodiment, the virion may comprise the GP of the Ippy virus, Latino virus, or Olivero virus as envelope protein. Thus, the invention also provides the virions, viral particles, comprising any of the products of the GP genes described above as envelope protein. In this respect, the skilled person is aware that the envelope protein of a virion serves to identify and bind to receptor sites on the host's cell membrane. Thus, the virions of the invention comprise a chimeric GP protein on their surface as envelope protein, i.e. a GP protein different from the GP protein of VSV. However, the composition of the virions nucleic acid sequence content is not particularly limited. That is, for example, the chimeric VSV virons may comprise a non-functional gene coding for the GP of VSV. The chimeric VSV virons may also lack a gene coding for the GP of VSV. The GP expressed on the surface of the chimeric VSV virion of the invention is a gene product of the gene coding for a GP protein of the Dandenong virus or Mopeia virus as described further above. In a further embodiment, the GP expressed on the surface of the chimeric VSV virion of the invention may be a gene product of the gene coding for a GP of the Ippy virus, Latino virus, or Olivero virus as described further above. Thus, the GP protein may comprise an amino acid sequence as shown in any one of SEQ ID NOs: 2, or 4. Alternatively, the GP protein may comprise an amino acid sequence as shown in any one of SEQ ID NOs: 6, 8 or 10. The chimeric VSV virions of the invention may also comprise as envelope protein a protein comprising an amino acid sequence having 60, 65, 70, 75, 80, 85, 90 or 95% sequence identity to SEQ ID NO:2, or 45, 50, 55, 60, 65, 70, 75, 80, 85, 90 or 95% sequence identity to SEQ ID NO:4, or 45, 50, 55, 60, 65, 70, 75, 80, 85, 90 or 95% sequence identity to SEQ ID NO:6, or 92, 93, 94, 95, 96, 97, 98 or 99% sequence identity to SEQ ID NO:8 or 60, 65, 70, 75, 80, 85, 90 or 95% sequence identity to SEQ ID NO:10, wherein the envelope protein maintains the cellular tropism and functionality of a chimeric VSV virion comprising as envelope protein a GP comprising an amino acid sequence as shown in any one of SEQ ID NOs:2, 4, 6, 8 or 10.

The invention also provides a virus producing cell, characterized in that the cell produces a chimeric VSV virion of the invention. The cell may be of any origin and may be present as isolated cell or as a cell comprised in a cell population. It is preferred that the cell producing a pseudotyped VSV virion of the invention is a mammalian cell. In a more preferred embodiment, the virus producing cell of the invention is characterized in that the mammalian cell is a multipotent adult progenitor cell (MAPC), a neural stem cell (NSC), a mesenchymal stem cell (MSC), a HeLa cell, any HEK293 cell, a Vero cell or a bone marrow derived tumor infiltrating cell (BM-TIC). Alternatively, the virus producing cell may be a human cell, monkey cell, mouse cell or hamster cell. The skilled person is aware of methods suitable for use in testing whether a given cell produces a virus and, thus, whether a particular cell falls within the scope of this invention. In this respect, the amount of virus produced by the cell of the invention is not particularly limited. Preferred viral titers are $\geq 1 \times 10^7$ TCID50/ml or $\geq 1 \times 10^8$ genome copies/ml in the crude supernatants of the given cell culture after infection without further downstream processing.

In a particular embodiment, the virus producing cell of the invention is characterized in that the cell comprises one or more expression cassettes for the expression of at least one of the genes selected from the group consisting of genes n, l, p and m coding for proteins N, L, P and M of the VSV and a gene gp coding for Dandenong-GP or Mopeia-GP glycoprotein.

The virus producing cells of the invention may be used, for example, in gene therapy. For such purposes, a virus producing cell is provided, which is characterized in that the cell comprises a gene transfer vector for the packaging into a VSV virion pseudotyped with GP of Dandenong or Mopeia virus, wherein the gene transfer vector comprises a transgene. In this respect, the transgene may be any gene addressing a particular need of the host.

Transgenes within the meaning of the present invention may be transferred into cells using the means provided herein. Thus, in one embodiment, the invention relates to a method for transfer of a transgene into a cell in vitro or in vivo, characterized in that the cell is transduced with a chimeric virion of the invention, wherein the virion comprises a transgene. Transgenes may also be transferred using the virus producing cells of the invention. Thus, in a further embodiment, a method for transfer of a transgene into a cell in vitro, characterized in that the cell is contacted with a virus producing cell of the invention is provided. It is preferred that the cell into which the transgene is transferred is a tumor cell.

In a further embodiment, the invention relates to a pharmaceutical composition comprising any of the means provided herein. The pharmaceutical composition may thus be characterized in that the composition comprises the VSV chimeric vector of the invention, the VSV chimeric vector system of the invention, the chimeric VSV virion of the invention, or the virus producing cell of the invention.

In a further embodiment, the means provided herein, in particular the VSV chimeric vector of the invention, the VSV chimeric vector system of the invention, the chimeric VSV virion of the invention, the virus producing cell of the invention, or the pharmaceutical composition of the invention, are provided for use as medicament.

The invention further relates to the VSV chimeric vector of the invention, the VSV chimeric vector system of the invention, the chimeric VSV virion of the invention, the virus producing cell of the invention, or the pharmaceutical composition of the invention for use in treating cancer. In a preferred embodiment, the cancer is a solid cancer. In a more preferred embodiment, the solid cancer may be brain cancer, colorectal cancer, oropharyngeal squamous cell carcinoma, gastric cancer, gastroesophageal junction adenocarcinoma, esophageal carcinoma, hepatocellular carcinoma, pancreatic adenocarcinoma, cholangiocarcinoma, bladder urothelial carcinoma, metastatic melanoma, prostate carcinoma, breast carcinoma, glioblastoma, non-small cell lung cancer, brain tumor or small cell lung cancer.

In a further embodiment of the invention, the VSV chimeric vector, the VSV chimeric vector system, the chimeric VSV virion, the virus producing cell or the pharmaceutical composition of the invention is provided, wherein the VSV chimeric vector, the VSV chimeric vector system, the chimeric VSV virion, the virus producing cell or the pharmaceutical composition is combined with a PD-1 or PD-L1 antagonist. Such combination may occur prior to administration, i.e. the VSV chimeric vector, the VSV chimeric vector system, the chimeric VSV virion, the virus producing cell or the pharmaceutical composition of the invention may be combined with the PD-1 or PD-L1 antagonist prior to administration to a patient in need thereof to form a combination formulation. Alternatively, the VSV chimeric vector, the VSV chimeric vector system, the chimeric VSV virion, the virus producing cell or the pharmaceutical composition of the invention may be administered separately to form a combination treatment. Thus, the invention also relates to a pharmaceutical composition comprising the VSV chimeric vector, the VSV chimeric vector system, the chimeric VSV virion, the virus producing cell or the pharmaceutical composition of the invention and a PD-1 or PD-L1 antagonist for uses provided herein. Moreover, the invention relates to a treatment method comprising the administration of the VSV chimeric vector, the VSV chimeric vector system, the chimeric VSV virion, the virus producing cell or the pharmaceutical composition of the invention and administration of a PD-1 or PD-L1 antagonist.

Within the present invention, the skilled person, in particular a physician, may chose the appropriate route of administration for the VSV chimeric vector, the VSV chimeric vector system, the chimeric VSV virion, the virus producing cell or the pharmaceutical composition of the invention. In a particular embodiment, the VSV chimeric vector, the VSV chimeric vector system, the chimeric VSV virion, the virus producing cell or the pharmaceutical composition of the invention are provided, wherein the VSV chimeric vector, the VSV chimeric vector system, the chimeric VSV virion, the virus producing cell or the pharmaceutical composition is to be administered intratumorally or intravenously. In a another embodiment, the VSV chimeric vector, the VSV chimeric vector system, the chimeric VSV virion, the virus producing cell or the pharmaceutical composition for use according to the invention are provided, wherein the VSV chimeric vector, the VSV chimeric vector system, the chimeric VSV virion, the virus producing cell or the pharmaceutical composition is to be administered intratumorally and subsequently intravenously. That is, the VSV chimeric vector, the VSV chimeric vector system, the chimeric VSV virion, the virus producing cell or the pharmaceutical composition of the invention may be suitably formulated for intravenous or intratumoral administration.

The invention also provides methods for treating a subject, in particular a human subject, wherein the subject has cancer, in particular a solid tumor, the method comprising administering the VSV chimeric vector of the invention, the VSV chimeric vector system of the invention, the chimeric VSV virion of the invention, the virus producing cell of the invention, or the pharmaceutical composition of the invention in a therapeutically effective amount. In a particular embodiment, the solid cancer is brain cancer, colorectal cancer, oropharyngeal squamous cell carcinoma, gastric cancer, gastroesophageal junction adenocarcinoma, esophageal carcinoma, hepatocellular carcinoma, pancreatic adenocarcinoma, cholangiocarcinoma, bladder urothelial carcinoma, metastatic melanoma, prostate carcinoma, breast carcinoma, glioblastoma, non-small cell lung cancer, brain tumor or small cell lung cancer.

The invention furthermore relates to kits comprising the means provided herein.

BRIEF DESCRIPTION OF THE FIGURES

FIG. 1 is a table (Table 1): Comparison of Old World Arenavirus (A) and New World Arenavirus clade C (B) GPC sequences.

Sequences were obtained from NCBI. The numbers of N-linked glycosylation signals N×T or N×S were inferred from the translated nucleotide sequence and ranges from 6

(LCMV) to 10 (IPPV, OLIW) signals. Given amino acid positions correspond to the sequence position of the individual sequences starting at the methionine of the translation start. GPC sequences were compared to LCMV-GP WE HPI by pairwise MUSCLE alignments [17]. Relative Sequence Identity (% Seq Id.), absolute identity (n) and sequence similarity is shown. aa: amino acid, nt: nucleotide.

Figure 2:
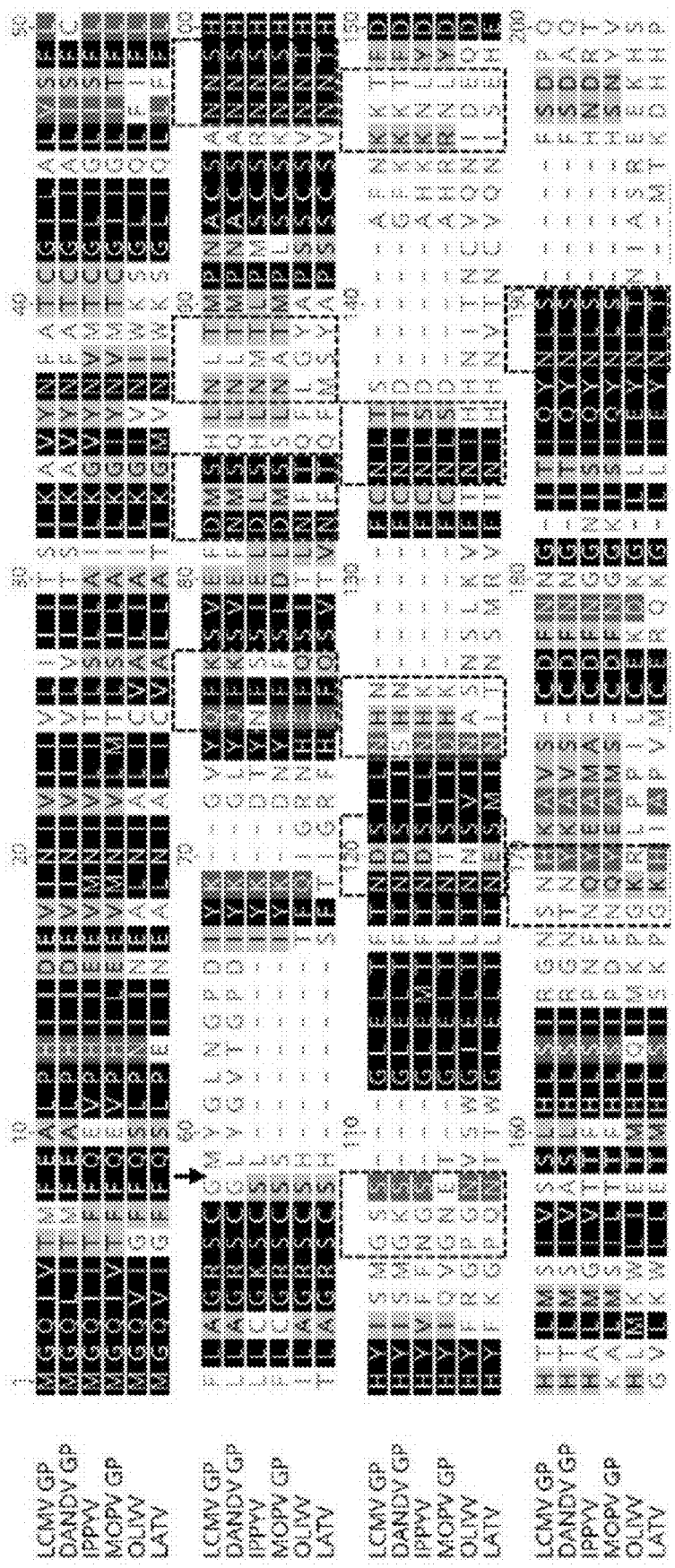
Figure 2:
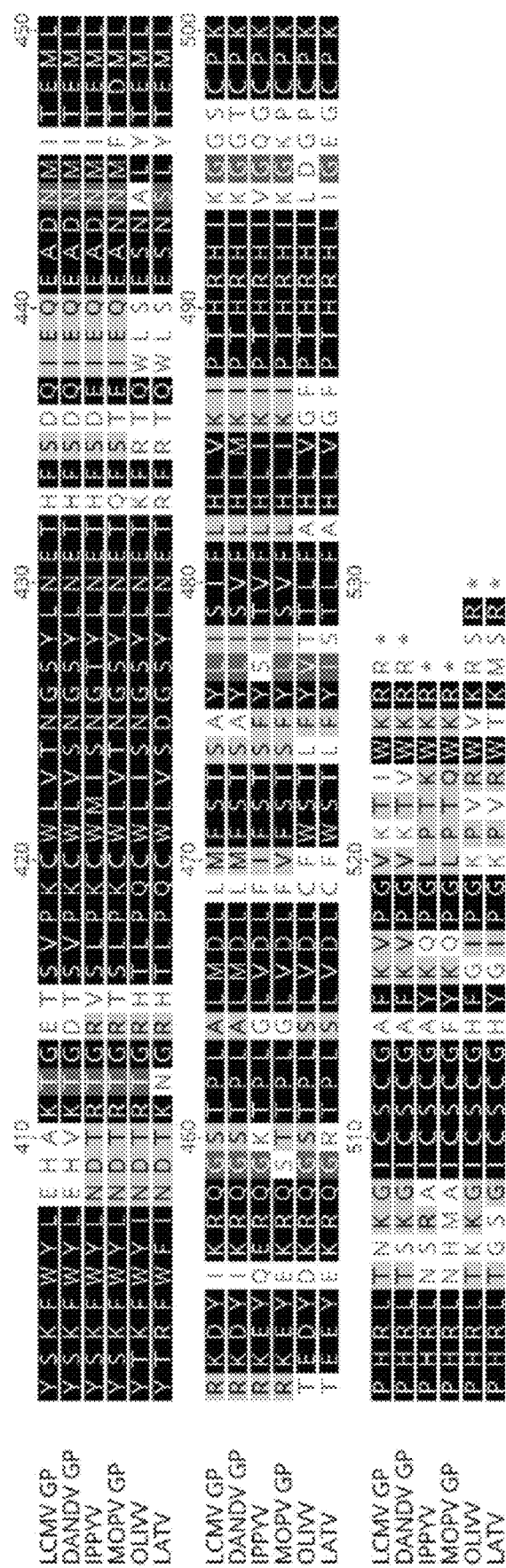

FIG. 2: Multiple sequence alignment of arenavirus glycoproteins.

Amino acid sequences of LCMV-GP WE HPI, DANVD GP, IPPYV GP, MOPV GP, OLIW GP and LATV GP were aligned using MUSCLE [17]. Black arrows indicate the cleavage sites of the signal peptidase and the cellular subtilisin kexin isozyme 1 (SKI-1)/site 1 protease (S1P), that cleave the precursor glycoprotein GPC into SSP, GP1 and GP2. Predicted N-linked glycosylation signal sequences N×T or N×S within the GP1 peptides of the arenavirus GP were boxed by dashed lines.

FIG. 3 is a table (Table 2): Nucleotide and amino acid sequence identity in the GPC region among the selected Old World and New World clade C arenaviruses.

FIG. 4: GFP expression in BHK21CI.13 cells infected with trans-complemented VSV*$M_O\Delta G$ virus.

Non-cytopathic VSV*$M_O\Delta G$ virus, carrying the mutations M33A, M51R, V221F and S226R within the VSV matrix protein and with replacement of the entire coding sequence for the G protein by the eGFP sequence [18], was trans-complemented in BHK21CI.13 cells. 24 h before infection with VSV*$M_O\Delta G$ at a multiplicity of infection (MOI) of 3, BHK2101.13 were transiently transfected with expression plasmids pCAG-DANDV-GP, pCAG-IPPYV-GP, pCAG-LATV-GP, pCAG-MOPV-GP or pCAG-OLIW-GP to express the respective arenavirus GPs in the cells. For control, cells were mock transfected. Supernatants containing trans-complemented viruses were harvested at 24 h post infection and passaged undiluted (neat) or in serial ten-fold dilutions in a range of 1:10 to 1:1000 either on BHK21CI.13 cells (A) or on BHK-556 cells (B). In BHK-566 cells which stably expresses the LCMV-GP, VSV □G GFP viruses trans-complemented with DANDV-GP, LATV-GP, MOPV-GP or OLIW-GP were able to spread within the cell culture even at high dilutions, leading to a ubiquitous GFP expression after 48 h post infection. IPPY-GP did not trans-complement VSV*$M_O\Delta G$ virus, hence BHK-566 cells did not express GFP at levels higher than the mock control. GFP fluorescence was imaged at 48 h post infection with identical exposure times on a Leica DM2500 fluorescent microscope.

FIG. 5 is a table (Table 3): Cytopathic effects of VSV*$M_{cp}\Delta G$ trans-complemented virus.

VSV*$M_{cp}\Delta G$ virus [18] was trans-complemented in BHK21CI.13 cells. 24 h before infection with VSV*$M_{cp}\Delta G$ at a M01=3, BHK21CI.13 were transiently transfected with expression plasmids pCAG-DANDV-GP, pCAG-IPPYV-GP, pCAG-LATV-GP, pCAG-MOPV-GP or pCAG-OLIW-GP. For control, cells were mock transfected. Supernatants containing trans-complemented viruses were harvested after 24 hpi and passaged undiluted (neat) or in serial ten-fold dilutions in a range of 1:10 to 1:1000 either on BHK21CI.13 cells (A) or on BHK-556 cells (B). In BHK-566 cells which stably expresses the LCMV-GP, VSV*$M_{cp}\Delta G$ viruses trans-complemented with DANDV-GP, LATV-GP, MOPV-GP or OLIVV-GP were able to spread within the cell culture even at high dilutions. Cytopathic effect (CPE) was monitored at 48 h post infection under bright-field microscope. Classification of CPE ranges from strong CPE (++++) to no CPE visible (−).

Figure 6:
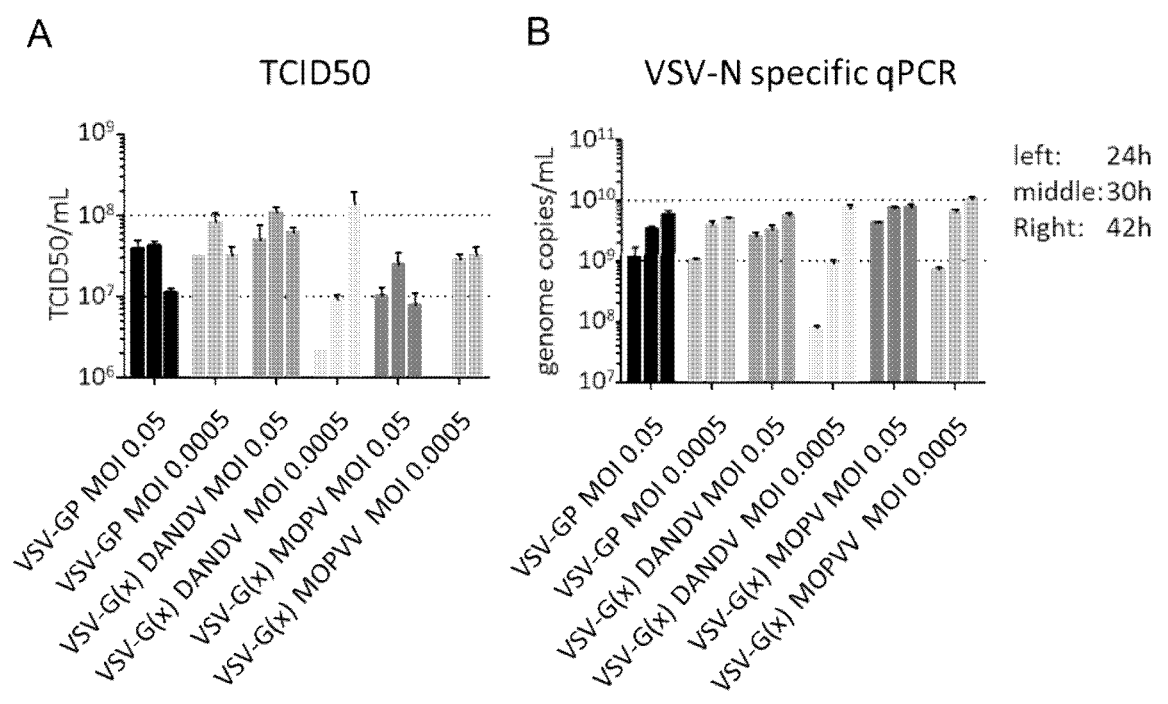

FIG. 6: VSV-G(x) DANDV and MOPV replication kinetics.

Vero cells were seeded for infection in T75 cell culture flasks at a density of $4\times10^4$ cells/cm$^2$, and infected 24 h later with the indicated MOI (Multiplicity of Infection, 0.05 or 0.0005) of VSV-GP as control and the two variants VSV-G(x) DANDV and VSV-G(x) MOPV. Samples were taken after 24, 30 and 42 h and the infectious titer was determined by TCID50 (A) and the genomic titer (B) was determined by qPCR.

Figure 7:
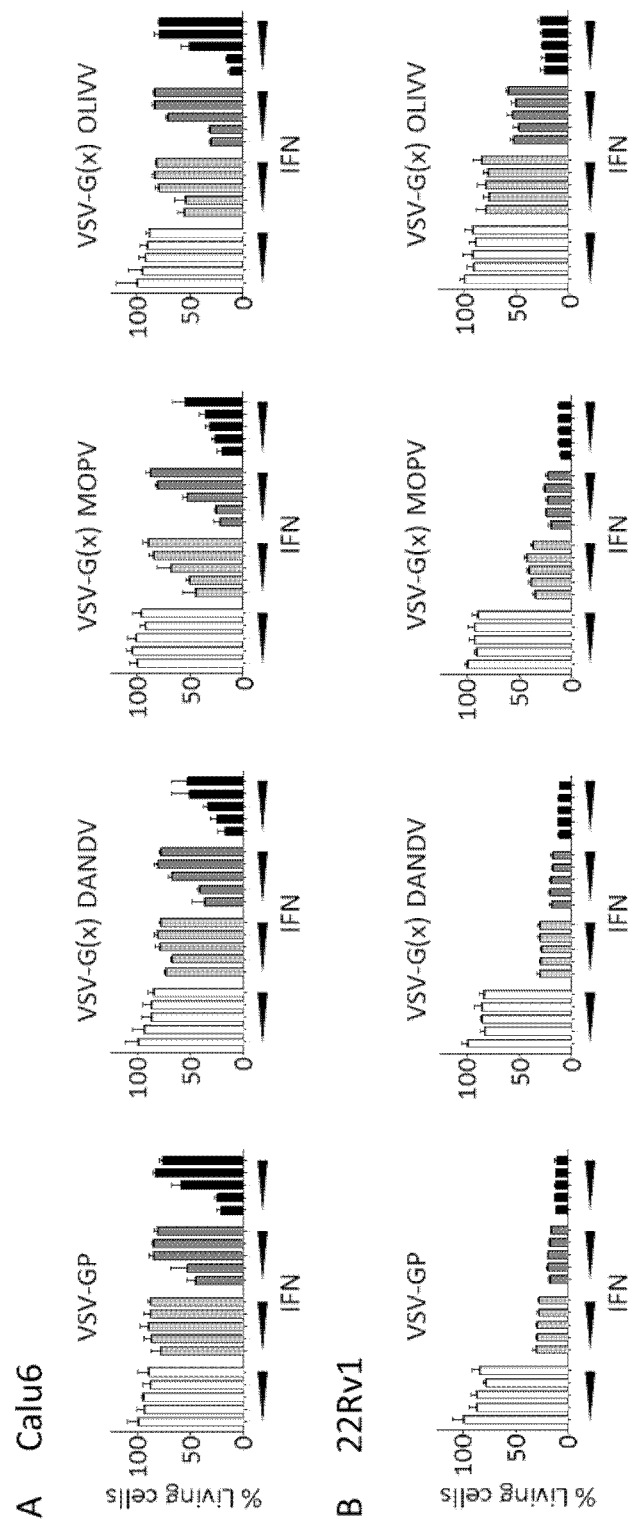

FIG. 7: Type I interferon (IFN) limited VSV-G(x) replication in human tumor cell lines.

Human Calu6 (A) and 22Rv1 (B) cells were pre-incubated with indicated amounts of IFN for 16 hours. Subsequently, cells were infected in quadruplicates with VSV-GP, VSV-G(x) DANDV, VSV-G(x) MOPV or VSV-G(x) OLIVV at an MOI of 0.1, 1, or 10, or left uninfected as a negative control. Three days after infection, cells were analyzed for viability using an MTT assay. The graph shows mean±SEM, the viability of non-infected cells that were not pre-treated with IFN was normalized to 100%.

Figure 8:
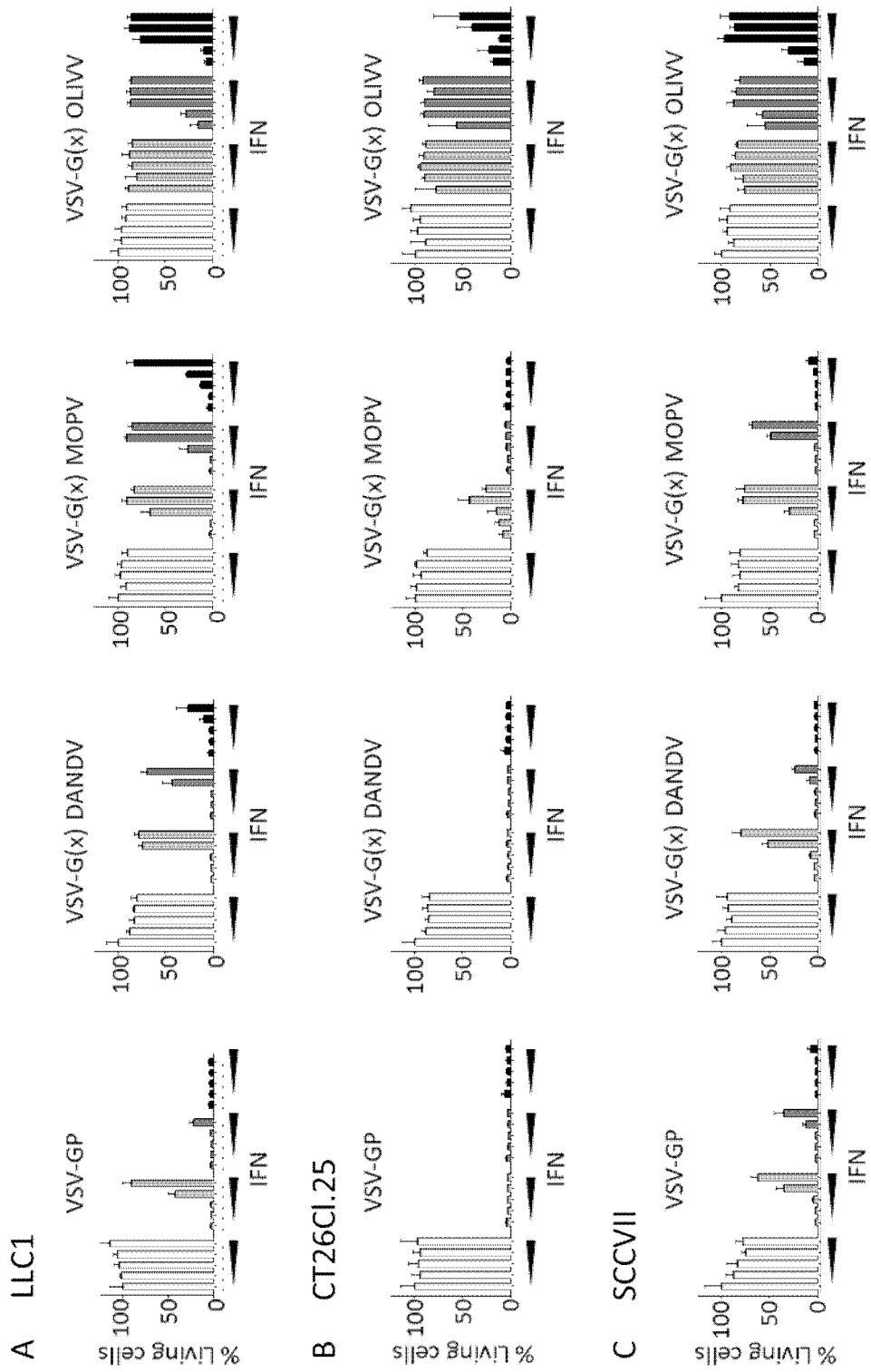

FIG. 8: Type I interferon (IFN) limited VSV-G(x) replication in murine tumor cell lines.

Murine SCCVII (A), Ct26CI.25 (B) or LLC1 (C) cells were pre-incubated with indicated amounts of IFN for 16 hours. Subsequently, cells were infected in quadruplicates with VSV-GP, VSV-G(x) DANDV, VSV-G(x) MOPV or VSV-G(x) OLIVV at an MOI of 0.1, 1, or 10, or left uninfected as a negative control. Three days after infection, cells were analyzed for viability using an MTT assay. The graph shows mean±SEM, the viability of non-infected cells that were not pre-treated with IFN was normalized to 100%.

Figures 9, 10:
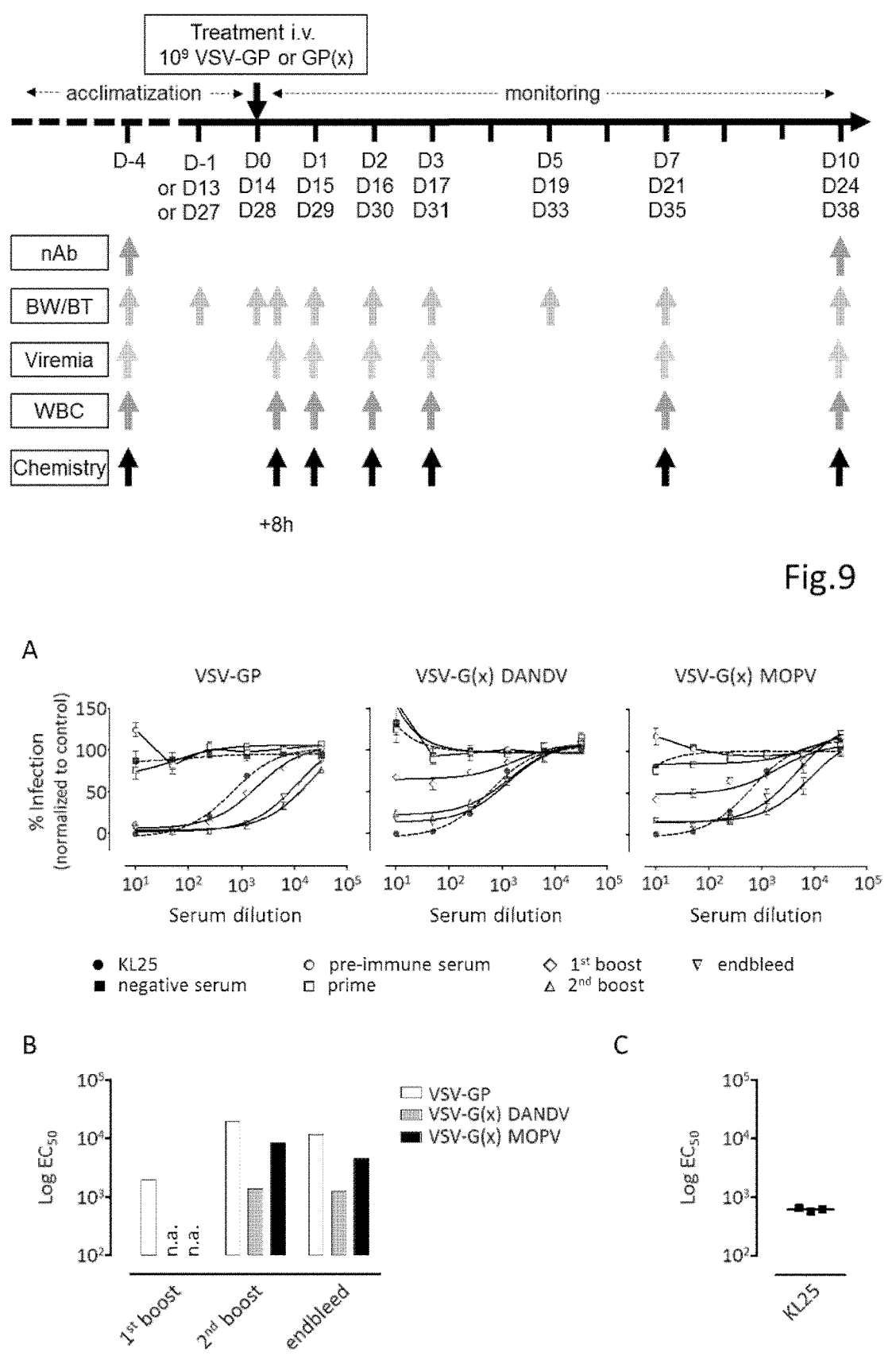

FIG. 9: Schedule of rabbit treatments and monitoring.

The schedule shows the design of one treatment out of three. All cycles of treatment were identical and started at D0, D14 and D28 with the i.v. injection of VSV-GP or VSV-G(x) viruses. Time points at which rabbits were handled are indicated by arrows. nAb, neutralizing antibody; BW, body weight; BT, body temperature; WBC, whole blood count.

FIG. 10: Neutralizing antibody induction in rabbits immunized with LCMV-GP, DANDV-GP and MOPV-GP recombinant VSV vectors.

Sera collected at day −4, at day 10 after each virus treatment (prime, 1$^{st}$ boost, 2$^{nd}$ boost) and at the end of the experiment were analysed for neutralizing antibodies against the autologous arenavirus glycoprotein. Sera were tested for their neutralizing capacities using VSV ΔG SEAP pseudo-typed with either LCMV-GP WE HPI, DANDV-GP or MOPV-GP described in detail in the method section. (A) The infection rate [in %], normalized to the no-serum control, was plotted versus the serum dilutions ranging from 1:10 to 1:31.250. After the prime immunization (open squares), none of the rabbits show nAbs directed against the arenavirus GPs of LCMV, DANDV or MOPV. After the first boost sera of rabbits immunized with VSV-G(x) DANDV and MOPV show only partial neutralization of the autologous VSV ΔG SEAP virus when compared to sera of VSV-GP immunized rabbits, hence calculation of the corresponding EC50 values was not applicable (n.a.). EC50 values were calculated after non-linear curve fit (B). Neutralization of VSV-ΔG SEAP GP by the LCMV-GP neutralizing antibody KL25 was used as inter assay control (C).

Figure 11:
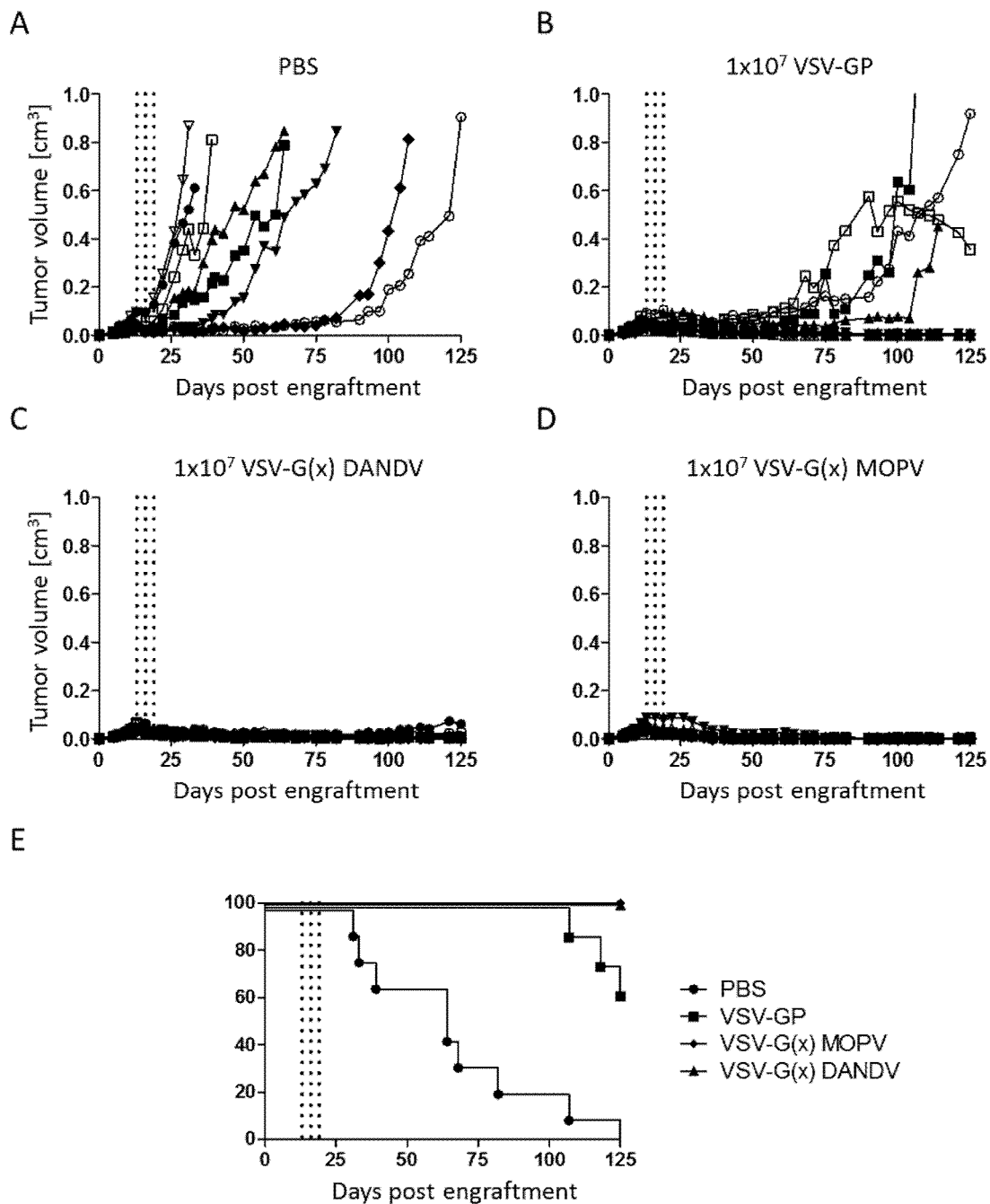

FIG. 11: Efficacy of intratumoral treatment with different arenavirus glycoprotein GP recombinant VSV vectors in a lung cancer xenograft mouse model.

$5\times10^6$ Calu6 lung cancer cells were injected subcutaneously into the right flank of 8 week old NMRI nude mice. Treatment started, when the mean size of tumors reached a volume between 0.05 and 0.07 cm$^3$. Mice were treated three times 4 days apart either with PBS (n=8) mice intratumorally (A), or with $1\times10^7$ TCID50 VSV-GP (B), VSV-G(x) DANDV or VSV-G(x) MOPV (D) Animals were monitored for tumor growth every 2-3 days after start of treatment, and sacrificed when tumor volume reached 0.8 cm$^3$ or tumors ulcerated. Kaplan-Meier survival curve (E). Dotted lines indicate time points of virus injection.

FIG. 12 is a table (Table 4): Scores for the evaluation of virus induced neurotoxicity.

Neurotoxicity scoring of infected mice is based on different categories such as general appearance, clinical observations, body condition provoked behaviour motility and respiration. The scores in the different categories range from 0-3. The cumulative tox score shown in FIG. 12 is calculated by addition of the scores of each category.

Figure 13:
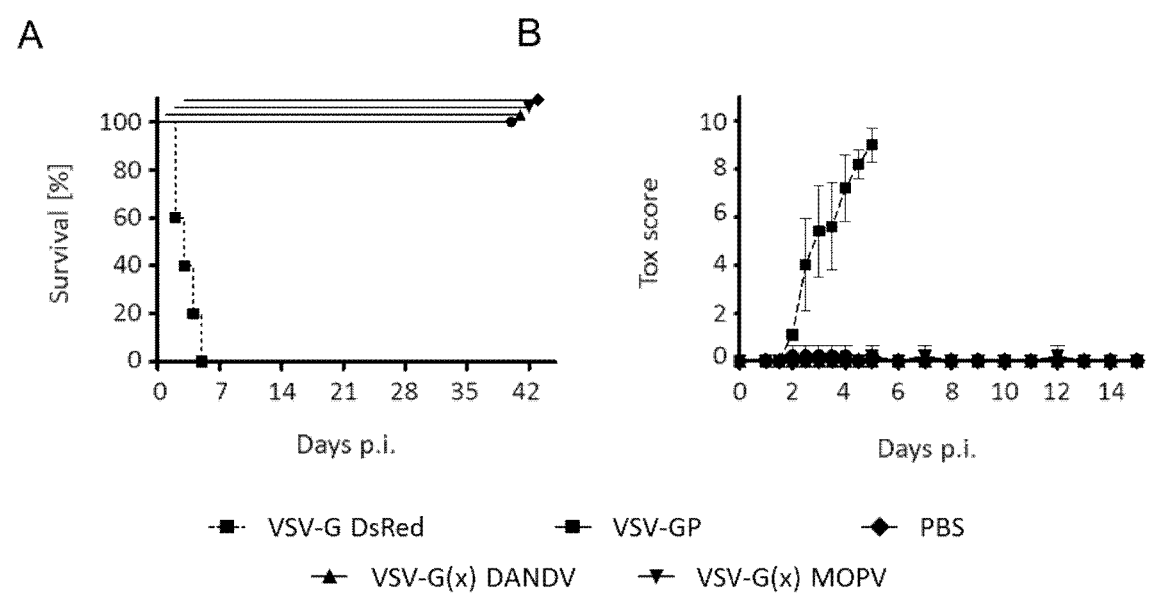

FIG. 13: Neurotoxicity in Swiss CD1 mice.

Swiss CD-1 mice received a single intracranial injection of 3 μl containing $1\times10^6$ TCID50 via stereotactic injection into the right striatum. PBS was administered i.c. in the control group. Animals were monitored daily for signs of neurotoxicity and general well-being according to FIG. 12 for 42 days. (A) Mouse survival of PBS (diamonds), VSV-G DsRed (squares), VSV-GP (dots), VSV-GP(x) Dandenong (triangles) and VSV-GP(x) Mopeia (reversed triangles) experimental groups were plotted as Kaplan-Meier curves. Kaplan-Meier analysis indicates that none of the tested virus variants show neurotoxicity in mice. (B) Cumulative tox score, calculated according to FIG. 12, indicates that there is no neurotoxicity observed within in the groups. Only the VSV-G DsRed control group, which contains the wildtype VSV glycoprotein at the virion surface developed neurological signs leading to euthanasia within the first week after i.c. infection.

DETAILED DESCRIPTION

As described above, the invention generally relates to the provision of chimeric VSV vectors, wherein the VSV vectors lack a functional gene coding for the envelope protein GP of VSV and, instead, comprise a gene coding for a glycoprotein GP of an arenavirus, in particular the Dandenong virus or Mopeia (MOPV) virus. Alternatively, the vectors may comprise the GP of the Ippy virus, Latino virus or Olivero virus. As the skilled person is aware, the glycoprotein GP is an envelope protein present on the surface of virions, which is responsible for binding between the virion and a cell of a host organism. Thus, the envelope protein determines the tropism of the virion. By altering the tropism of VSV, chimeric VSV vectors may be prepared that are suitable for use in medicine. Such chimeric vectors/virions have been provided in the prior art, e.g. in WO 2010/040526. However, there is a need for further improved chimeric vectors that provide even more efficient treatment options and an even better suitability for medical use. This need is fulfilled by the present invention.

Unless defined otherwise, technical and scientific terms used herein have the same meaning as commonly understood by one of ordinary skill in the art to which this invention belongs and by reference to published texts, which provide one skilled in the art with a general guide to many of the terms used in the present application. The following definitions are provided for clarity only and are not intended to limit the claimed invention.

The terms "a" or "an" refers to one or more, for example, "a gene" is understood to represent one or more such genes. As such, the terms "a" (or "an"), "one or more," and "at least one" are used interchangeably herein. As used herein, the term "about" means a variability of 10% from the reference given, unless otherwise specified.

With regard to the following description, it is intended that each of the compositions herein described, is useful, in another embodiment, in the methods of the invention. In addition, it is also intended that each of the compositions herein described as useful in the methods, is, in another embodiment, itself an embodiment of the invention. While various embodiments in the specification are presented using "comprising" language, under other circumstances, a related, embodiment is also intended to be interpreted and described using "consisting of or "consisting essentially of" language.

In this respect, the vectors of the invention are based on the virus of the vesicular stomatitis and have at least the below general advantages over retroviral vectors:

(i) VSV vectors are oncolytic and have a particularly high oncolytic activity compared to other oncolytic viral vectors.

(ii) VSV vectors replicate preferentially in tumor cells and have a particularly high replication capability compared to other oncolytic viral vectors.

(iii) VSV vectors infect actively dividing cells as well as resting cells.

(iv) VSV vectors induce a strong innate humoral and cellular immune response.

(v) VSV vectors replicate purely cytoplasmatically, i.e., as RNA viruses they cannot integrate into the host cell genome or recombine into replication-competent viruses.

(vi) VSV vectors are easy to package.

(vii) The VSV glycoprotein is interchangeable with a foreign envelope protein. Examples for glycoproteins which were previously incorporated in the VSV envelope are: HIVgp160 [19], HCVE1/E2 [20], SARS S [21], Lassa GP [22] or the GP of LCMV.

However, the vectors of the invention have additional advantages over the prior art and, in particular, VSV pseudotyped with GP of LCMV.

Specifically, the vectors of the invention surprisingly show a reduced induction of neutralizing antibodies as compared to a VSV vector pseudotyped with GP of LCMV under identical conditions. The skilled person is aware of assays that may be employed in order to determine induction of neutralizing antibodies.

By using the assay as described in Example 5, the inventors surprisingly found that induction of neutralizing antibodies is reduced. Such an effect could not have been reasonably expected by the skilled person. Moreover, the significance of this effect proves that the vectors and further means provided herein provide clear advantages. In this respect, it is preferred that induction of neutralizing antibodies by the vectors/virions provided herein is reduced as compared to a VSV vector pseudotyped with GP of LCMV.

The vectors/virions of the invention have not only proven to reduce neutralizing antibodies, but additionally show increased killing of tumor cells as compared to a VSV vector pseudotyped with GP of LCMV under identical conditions. The skilled person is aware of assays that may be employed to determine/quantify killing of tumor cells. It is preferred that killing of tumor cells by the vectors/virions of the invention is increased as compared to a VSV vector pseudotyped with GP of LCMV.

In order to achieve the above-described surprising effects, the GP of VSV is non-functional while GP of Dandenong virus or Mopeia (MOPV) virus is incorporated or the GP of VSV is replaced by the GP of Dandenong virus or Mopeia (MOPV) virus. Alternatively, the GP of VSV is non-functional while the GP of Ippy virus, Latino virus or Olivero virus is incorporated or the GP of VSV is replaced by the GP of Ippy virus, Latino virus or Olivero virus. There are various possibilities how a VSV vector can be pseudotyped with any of the above GPs. Thus, the precise nucleic acid sequence of the vectors of the invention may vary as long as the GP of VSV is essentially absent from the surface of virions while the GP of any of the viruses above is expressed on the surface of the virions. Within the present invention, exemplary preferred vectors comprise a nucleic acid sequence comprising SEQ ID NOs: 1 or 3, 5, 7 or 9 or a nucleic acid sequence comprising a nucleic acid sequence at least 70, 75, 80, 85, 90, 95, 96, 97, 98, 99 or 100% identical to any one of SEQ ID NOs: 1, 3, 5, 7 or 9. In this respect, SEQ ID NO:1 corresponds to a preferred nucleic acid sequence coding for the GP of the Dandenong virus, SEQ ID NO:3 corresponds to a preferred nucleic acid sequence coding for the GP of the Mopeia virus, SEQ ID NO:5 corresponds to a preferred nucleic acid sequence coding for the GP of the Ippy virus, SEQ ID NO:7 corresponds to a preferred nucleic acid sequence coding for the GP of the Latino virus and SEQ ID NO:9 corresponds to a preferred nucleic acid sequence coding for the GP of the Olivero virus.

"Percent (%) nucleic acid sequence identity" with respect to a reference nucleic acid sequence is defined as the percentage of nucleotides in a candidate sequence that are identical with the nucleotides in the reference sequence. Methods to determine the percentage of identical nucleotides are known to the person skilled in the art. Within the present invention, it is preferred to use computer software such as BLAST. Parameters can readily be determined by the skilled person.

While the nucleic acid sequences coding for any of the GP genes used for pseudotyping VSV may vary, it is important that the functionality conferred by the GP encoded by the preferred gene sequence provided above is maintained. The functionality parameters that are maintained are, preferably, the induction of neutralizing antibodies, the killing of tumor cells and/or the tropism. In this respect, the above provided assays can be employed. Moreover, the skilled person is aware of assays that may be employed in order to determine tropism of a viral particle/virion.

As the skilled person will appreciate, a nucleic acid sequence may be varied with or without changing the primary sequence of the encoded polypeptide. It is preferred within the present invention that the polypeptide sequences encoded by the genes used for pseudotyping remain unchanged with respect to the GP proteins encoded by SEQ ID NOs: 1, 3, 5, 7 or 9, respectively. That is, it is preferred that the GP protein comprised in the virions of the invention corresponds to the GP protein of the Dandenong or Mopeia virus. More particularly, it is preferred that the virions of the invention comprise GP proteins comprising any one of the amino acid sequences shown by SEQ ID NOs: 2, 4, 6, 8 or 10. However, the skilled person is aware that the amino acid sequence of a polypeptide may be altered without affecting its functionality. Thus, polypeptides comprising alternative sequences are also encompassed by the present invention as long as the functionality of any one of the above amino acid sequences is essentially maintained.

Thus, in certain embodiments, virions comprising amino acid sequence variants of the GP proteins provided herein are contemplated. Amino acid sequence variants may be prepared by introducing appropriate modifications into the nucleotide sequence encoding the respective GP, or by peptide synthesis. Such modifications include, for example, deletions from, and/or insertions into and/or substitutions of residues within the amino acid sequences of the GP. Any combination of deletion, insertion, and substitution can be made to arrive at the final construct, provided that the final construct possesses the desired characteristics, e.g., induction of neutralizing antibodies, killing of tumor cells and/or tropism.

In certain embodiments, variants having one or more amino acid substitutions are provided. Conservative substitutions are shown in Table 5 under the heading of "preferred substitutions." More substantial changes are provided in Table 5 under the heading of "exemplary substitutions," and as further described below in reference to amino acid side chain classes. Amino acid substitutions may be introduced into a GP of interest and the products/virions screened for a desired activity.

Amino acids may be grouped according to common side-chain properties:
(1) hydrophobic: Norleucine, Met, Ala, Val, Leu, Ile;
(2) neutral hydrophilic: Cys, Ser, Thr, Asn, Gln;
(3) acidic: Asp, Glu;
(4) basic: His, Lys, Arg;
(5) residues that influence chain orientation: Gly, Pro;
(6) aromatic: Trp, Tyr, Phe.

TABLE 5

Amino acid substitutions

| Original Residue | Exemplary Substitutions | Preferred Substitutions |
| --- | --- | --- |
| Ala (A) | Val; Leu; Ile | Val |
| Arg (R) | Lys; Gln; Asn | Lys |
| Asn (N) | Gln; His; Asp, Lys; Arg | Gln |
| Asp (D) | Glu; Asn | Glu |
| Cys (C) | Ser; Ala | Ser |
| Gln (Q) | Asn; Glu | Asn |
| Glu (E) | Asp; Gln | Asp |
| Gly (G) | Ala | Ala |
| His (H) | Asn; Gln; Lys; Arg | Arg |
| Ile (I) | Leu; Val; Met; Ala; Phe; Norleucine | Leu |
| Leu (L) | Norleucine; Ile; Val; Met; Ala; Phe | Ile |
| Lys (K) | Arg; Gln; Asn | Arg |
| Met (M) | Leu; Phe; Ile | Leu |
| Phe (F) | Trp; Leu; Val; Ile; Ala; Tyr | Tyr |
| Pro (P) | Ala | Ala |
| Ser (S) | Thr | Thr |
| Thr (T) | Val; Ser | Ser |
| Trp (W) | Tyr; Phe | Tyr |
| Tyr (Y) | Trp; Phe; Thr; Ser | Phe |
| Val (V) | Ile; Leu; Met; Phe; Ala; Norleucine | Leu |

Non-conservative substitutions will entail exchanging a member of one of these classes for another class. Within the scope of the present invention, the variant GP proteins comprised in the virions of the invention maintain the functionality conferred on the virions by the non-altered GP proteins of Dandenong virus, Mopeia virus, Ippy virus, Latino virus or Olivero virus, respectively. Such variant GP proteins may have 60, 65, 70, 75, 80, 85, 90 or 95% sequence identity to SEQ ID NO:2, or 45, 50, 55, 60, 65, 70, 75, 80, 85, 90 or 95% sequence identity to SEQ ID NO:4, or 45, 50, 55, 60, 65, 70, 75, 80, 85, 90 or 95% sequence identity to SEQ ID NO:6, or 92, 93, 94, 95, 96, 97, 98 or 99% sequence identity to SEQ ID NO:8 or 60, 65, 70, 75, 80, 85, 90 or 95% sequence identity to SEQ ID NO:10, wherein the envelope protein maintains the cellular tropism and functionality of a chimeric VSV virion comprising as envelope protein a GP comprising an amino acid sequence as shown in any one of SEQ ID NOs:2, 4, 6, 8 or 10.

"Percent (%) amino acid acid sequence identity" with respect to a reference amino acid sequence is defined as the percentage of amino acids in a candidate sequence that are identical with the amino acids in the reference polypeptide sequence after aligning the sequences and introducing gaps, if necessary, to achieve the maximum percent sequence identity, and not considering any conservative substitutions as part of the sequence identity. Alignment for purposes of determining percent amino acid sequence identity can be achieved in various ways that are within the skill in the art, for instance, using publicly available computer software such as BLAST, BLAST-2, ALIGN or Megalign (DNASTAR) software. Those skilled in the art can determine appropriate parameters for aligning sequences, including any algorithms needed to achieve maximal alignment over the full length of the sequences being compared.

In a further embodiment, the invention relates to variant GP sequences having the functionality of any one of the Dandenong or Mopeia GP proteins, or the Ippy, Latino or Olivero GP, wherein the variant GP protein comprises 20, 15, 10, 5 or preferably 4, 3, 2 or 1 alteration(s).

In addition to their inherent oncolytic properties, the VSV chimeric vectors or vector systems based thereon and as provided herein can further be improved by introducing at least one transgene. The skilled person is aware of techniques that can be employed to introduce such transgenes into the vectors of the invention as well as where to introduce them. One exemplary approach comprises the steps of restriction and ligation or PCR and Gibson assembly. Transgenes that may be employed within the present invention are not particularly limited as long as a particular need is addressed by delivery of the transgene. Non-limiting, yet preferred, examples include transgenes coding for a suicide protein, a cytokine/chemokine, an antibody or antibody fragment binding to immune related receptors, a protein that serves for the purpose of vaccination, a viral fusion protein, a marker protein or fusions thereof.

To increase the safety during the use of replicable viruses in therapeutic uses, a vector system is provided which ensures that replication, oncolysis and the production of VSV viruses takes place only in cells which are infected by at least two replication-deficient mutually complementing vectors.

The invention thus, in one embodiment, relates to a VSV chimeric vector system, characterized in that the system comprises at least two complementary replicating VSV vectors, wherein the system comprises genes n, l, p and m coding for proteins N, L, P and M of the VSV, a gene gp coding for Dandenong-GP or Mopeia-GP, or alternatively Ippy-GP, Latino-GP or Olivero-GP, and lacks a functional gene coding for G protein of the VSV, wherein each vector of the system lacks one of the genes n, l, p, m and gp, and wherein the lacking gene is present on any other vector of the system. Such complementary replicating (cr) VSV vectors can spread to a limited extent within the targeted cell, for example a tumor cell, which increases the efficiency of the gene transfer and the oncolysis. Thus, the vector system according to the invention allows for the preparation of oncolytic VSV chimeric vectors with limited reproduction capability for the gene transfer in targeted cells, in particular tumor cells. The gene gp coding for LCMV-GP as well as possible additional genes such as therapy genes and/or marker genes can be present on any vector of the system.

Different variants of the vector system according to the invention are possible. For example, the vector system can consist of two vectors or more than two vectors. When the vector system consist of two vectors, a first vector may comprise GP of the Dandenong virus or Mopeia virus, or alternatively GP of the Ippy virus, Latino virus or Olivero virus, instead of GP of the VSV and a deletion of the gene p coding for the P protein. Also a second vector may comprise no VSV-G but express the P protein of the VSV. Each vector may express nucleoprotein (N) and polymerase (L) of the VSV as well as a less cytopathogenic variant of the M protein (Mncp). The first vector may carry in addition the marker gene rfp, whereas the second vector may carry a transgene.

The invention also provides a vector system comprising two vectors, wherein one vector comprises the GP of the Dandenong virus or Mopeia virus, or alternatively the GP of Ippy virus, Latino virus or Olivero virus, as defined herein and a second vector comprises the GP of LCMV. The second vector comprising the GP of LCMV may be a vector as described in WO 2010/040526.

The invention furthermore relates to cells producing the chimeric virions of the invention. Virus producing cells in the meaning of the invention include classical packaging cells for the production of virions from non-replicable vectors as well as producer cells for the production of virions from vectors capable of reproduction. Packaging cells usually comprise one or more plasmids for the expression of essential genes which lack in the respective vector to be packaged and/or are necessary for the production of virions. Such cells may be mammalian cells, in particular human cells, monkey cells, mouse cells or hamster cells, more particular HEK293 cells, HeLa cells, or Vero cells. Such cells are known to the skilled person who can select appropriate cell lines suitable for the desired purpose.

In previous studies, packaging cells were used for transferring viral vectors; however, this involved mainly fibroblasts which do not migrate within the tumor (Short et al., 1990, Culver et al., 1992). In contrast, adult stem cells, in particular neuronal (NSC), multipotent adult progenitor cells (MAPC) and mesenchymal stem cells (MSC) have a high migratory potential. They remain confined to the tumor tissue, whereby a very efficient but also specific gene transfer into the tumor tissue is achieved. However, these stem cells have limited passage capacity in vitro.

A subpopulation of adult mesenchymal stem cells, so-called BM-TIC (bone marrow derived tumor infiltrating cells) infiltrate, after injection into experimentally induced gliomas, the entire tumor and, in addition, track individual tumor cells remote from the tumor mass [23]. BM-TIC are isolated from adult bone marrow, have a high expansion potential and can be used as migrating producer cells for MLV [24] and VSV vectors.

The subject matter of the invention is thus virus producing cells which produce VSV chimeric vectors of the invention. In particular, these are tumor-infiltrating producer cells which release the said vectors during their migration within the tumor. Preferred cells are adult stem cells, in particular neuronal (NSC) and mesenchymal stem cells (MSC). Particularly preferred cells are BM-TIC cells derived from MSC.

The virus producing cells of the invention and hence also the VSV chimeric vectors produced by said cells may comprise a gene coding for a mutated M protein. This vector variant is selectively oncolytic for tumor cells, whereas it is not toxic for healthy cells. M variants with amino acid exchange in the 37PSAP40 region of the M protein or with single (M51R) or multiple (V221F and S226R; M33A and M51A) mutations outside of the PSAP region of the M protein are preferred. An M protein with mutations M33A, M51R, V22F and S226R is particularly preferred. In order to ensure an efficient virus production in packaging cells, the M variant can be stably transfected with a viral interferon antagonist.

In one embodiment, the virus producing is characterized in that the cell comprises one or more expression cassettes for the expression of at least one of the genes selected from the group consisting of genes n, l, p and m coding for proteins N, L, P and M of the VSV and a gene gp coding for Dandenong-GP or Mopeia-GP glycoprotein, or alternatively Ippy-GP, Latino-GP or Olivero-GP. The cell may furthermore comprise a gene transfer vector for the packaging into a VSV virion pseudotyped with GP of Dandenong or Mopeia virus, or alternatively Ippy, Latino or Olivero virus, wherein the gene transfer vector comprises a transgene.

In addition, subject matter of the invention is an in vitro method for gene transfer, wherein a VSV chimeric vector according to the invention or a VSV chimeric vector system according to the invention comprising a transgene is introduced into a cell either directly or by means of virus producing cells (packaging cells) according to the invention. If a cr vector system with at least two vectors is used, at least two packaging cells are used, wherein each of the cells produces one of the (replication-incompetent) cr vectors. The production of VSV viruses takes place only in cells which are infected with all vectors of the cr vector system and hence comprise all essential viral genes.

In addition, the invention relates to the use of vectors and virus producing cells according to the invention as drugs in therapeutic methods. In particular, the vectors and virus producing cells according to the invention are used for the therapy of solid cancers. The therapeutic effect is caused by the oncolytic properties of the recombinant vectors and viruses as well as by the use of therapeutic genes, without being bound by theory.

Solid cancer can be brain cancer, colorectal cancer, oropharyngeal squamous cell carcinoma, gastric cancer, gastroesophageal junction adenocarcinoma, esophageal carcinoma, hepatocellular carcinoma, pancreatic adenocarcinoma, cholangiocarcinoma, bladder urothelial carcinoma, metastatic melanoma, prostate carcinoma, breast carcinoma, glioblastoma, non-small cell lung cancer, brain tumor or small cell lung cancer.

The subject matter of the invention is further a pharmaceutical composition which comprises the vector, the virion, or the virus producing cell of the invention and optionally additives such as a pharmaceutically acceptable carrier and auxiliary substances.

In order to increase the viral oncolysis and the transfer efficiency of the therapeutic genes, tumor-infiltrating virus producing cells which continuously release vectors may be formulated for direct implantation into the tumors. The means provided herein may thus be formulated for intratumoral administration or intravenous administration.

The term "pharmaceutical formulation" or "pharmaceutical composition" refers to a preparation which is in such form as to permit the biological activity of an active ingredient contained therein to be effective, and which contains no additional components which are unacceptably toxic to a subject to which the formulation would be administered.

A "pharmaceutically acceptable carrier" refers to an ingredient in a pharmaceutical formulation, other than an active ingredient, which is nontoxic to a subject. A pharmaceutically acceptable carrier includes, but is not limited to, a buffer, excipient, stabilizer, or preservative.

As used herein, "treatment" (and grammatical variations thereof such as "treat" or "treating") refers to clinical intervention in an attempt to alter the natural course of the individual being treated, and can be performed either for prophylaxis or during the course of clinical pathology. Desirable effects of treatment include, but are not limited to, preventing occurrence or recurrence of disease, alleviation of symptoms, diminishment of any direct or indirect pathological consequences of the disease, preventing metastasis, decreasing the rate of disease progression, amelioration or palliation of the disease state, and remission or improved prognosis. In some embodiments, antibodies of the invention are used to delay development of a disease or to slow the progression of a disease.

Pharmaceutical formulations of the vectors, virions or cells as described herein are prepared by mixing such vectors, virions or cells having the desired degree of purity with one or more optional pharmaceutically acceptable carriers [25], in the form of lyophilized formulations or aqueous solutions. Pharmaceutically acceptable carriers are generally nontoxic to recipients at the dosages and concentrations employed, and include, but are not limited to: buffers such as phosphate, citrate, and other organic acids; antioxidants including ascorbic acid and methionine; preservatives (such as octadecyldimethylbenzyl ammonium chloride; hexamethonium chloride; benzalkonium chloride; benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g. Zn protein complexes); and/or non-ionic surfactants such as polyethylene glycol (PEG). Exemplary pharmaceutically acceptable carriers herein further include interstitial drug dispersion agents such as soluble neutral-active hyaluronidase glycoproteins (sHASEGP), for example, human soluble PH-20 hyaluronidase glycoproteins, such as rHuPH20 (HYLENEX®, Baxter International, Inc.). Certain exemplary sHASEGPs and methods of use, including rHuPH20, are described in US Patent Publication Nos. 2005/0260186 and 2006/0104968. In one aspect, a sHASEGP is combined with one or more additional glycosaminoglycanases such as chondroitinases.

The formulation herein may also contain more than one active ingredient as necessary for the particular indication being treated, preferably those with complementary activities that do not adversely affect each other.

Active ingredients may be entrapped in microcapsules prepared, for example, by coacervation techniques or by interfacial polymerization, for example, hydroxymethylcellulose or gelatin-microcapsules and poly-(methylmethacylate) microcapsules, respectively, in colloidal drug delivery systems (for example, liposomes, albumin microspheres, microemulsions, nano-particles and nanocapsules) or in macroemulsions. Such techniques are disclosed in [25]. Sustained-release preparations may be prepared. Suitable examples of sustained-release preparations include semipermeable matrices of solid hydrophobic polymers containing the antibody or immunoconjugate, which matrices are in the form of shaped articles, e.g. films, or microcapsules. The formulations to be used for in vivo administration are generally sterile. Sterility may be readily accomplished, e.g., by filtration through sterile filtration membranes.

In one aspect, the vector, virion, cell or pharmaceutical composition according to the invention for use as a medicament is provided. In further aspects, the vector, virion, cell or pharmaceutical composition according to the invention for use in a method of treatment are provided. In certain embodiments, the vector, virion, cell or pharmaceutical composition according to the invention for use in treating cancer are provided. In certain embodiments, the invention provides the vector, virion, cell or pharmaceutical composition of the invention for use in a method of treating an individual having cancer, the method comprising administering to the individual an effective amount of the vector, virion, cell or pharmaceutical composition. In one such embodiment, the method further comprises administering to the individual an effective amount of at least one additional therapeutic agent, e.g., as described below.

In a further aspect, the invention provides for the use of a vector, virion, cell or pharmaceutical composition of the invention in the manufacture or preparation of a medicament. In one embodiment, the medicament is for treatment of cancer, in particular a solid tumor. In a further embodiment, the medicament is for use in a method of treating cancer, in particular a solid cancer, the method comprising administering to an individual having cancer, in particular a solid cancer, an effective amount of the medicament. In one such embodiment, the method further comprises administering to the individual an effective amount of at least one additional therapeutic agent, e.g. a therapeutic agent that is an antagonist of PD-1 or PD-L1.

In a further aspect, the invention provides a method for treating cancer, in particular a solid cancer. In one embodiment, the method comprises administering to an individual having cancer an effective amount of the vector, virion, cell or pharmaceutical composition of the invention. In one such embodiment, the method further comprises administering to the individual an effective amount of at least one additional therapeutic agent, as described below.

An "individual" according to any of the above embodiments may be a human. However, included is any mammal in need of these methods of treatment or prophylaxis, including particularly humans. Other mammals in need of such treatment or prophylaxis include dogs, cats, or other domesticated animals, horses, livestock, laboratory animals, including non-human primates, etc. The subject may be male or female. In one embodiment, the subject has, or is at risk of developing, cancer and more particularly, a solid tumor.

As described above, the invention provides pharmaceutical compositions comprising any of the vector, virion or cell provided herein, e.g., for use in any of the above therapeutic methods. In one embodiment, a pharmaceutical formulation comprises any of the vector, virion, or cell provided herein and a pharmaceutically acceptable carrier. In another embodiment, a pharmaceutical formulation comprises any of the vector, virion, or cell provided herein and at least one additional therapeutic agent, e.g., as described below.

The vector, virion, cell or pharmaceutical composition of the invention can be used either alone or in combination with other agents in a therapy. For instance, the vector, virion, cell or pharmaceutical composition of the invention may be co-administered with at least one additional therapeutic agent.

"Therapeutic agents" within the meaning of the invention are molecules including, without limitation, polypeptides, peptides, glycoproteins, nucleic acids, synthetic and natural drugs, peptides, polyenes, macrocyles, glycosides, terpenes, terpenoids, aliphatic and aromatic compounds, and their derivatives. In a preferred embodiment, the therapeutic agent is an antagonist of PD-1 or PD-L1. In another preferred embodiment, the therapeutic agent is a checkpoint inhibitory antibody or any other immune therapeutic that stimulates the immune response of the individual. In yet another embodiment, the therapeutic agent is a chemotherapeutic agent. The chemotherapeutic agent may be substantially any agent which exhibits an oncolytic effect against tumor cells in an individual and which does not inhibit or diminish the oncolytic effect of the oncolytic virus of the invention. The agent may be any known or subsequently discovered chemotherapeutic agent. By way of example, known types chemotherapeutic agents include, for example, anthracyclines, alkylating agents, alkyl sulfonates, aziridines, ethylenimines, methylmelamines, nitrogen mustards, nitrosoureas, antibiotics, antimetabolites, folic acid analogs, purine analogs, pyrimidine analogs, enzymes, podophyllotoxins, platinum-containing agents, interferons, and interleukins.

Suitable therapeutic agents include, without limitation, those presented in Goodman and Oilman's The Pharmacological Basis of Therapeutics (e.g., 9th Ed.) or The Merck Index (e.g., 12th Ed.). Genera of therapeutic agents include, without limitation, drugs that influence inflammatory responses, drugs that affect the composition of body fluids, drugs affecting electrolyte metabolism, chemotherapeutic agents (e.g., for hyperproliferative diseases, particularly cancer, for parasitic infections, and for microbial diseases), antineoplastic agents, drugs affecting the blood and blood-forming organs, hormones and hormone antagonists, vitamins and nutrients, vaccines, oligonucleotides and gene therapies. It will be understood that compositions comprising combinations, e.g. mixtures or blends of two or more active agents, such as two drugs, are also encompassed by the invention.

Such combination therapies noted above encompass combined administration (where two or more therapeutic agents are included in the same or separate formulations), and separate administration, in which case, administration of the vector, virion, cell or pharmaceutical composition of the invention can occur prior to, simultaneously, and/or following, administration of the additional therapeutic agent and/or adjuvant. The vector, virion, cell or pharmaceutical composition of the invention can also be used in combination with radiation therapy.

The vector, virion, cell or pharmaceutical composition of the invention (and any additional therapeutic agent) can be administered by any suitable means, including parenteral, intrapulmonary, and intranasal, and, if desired for local treatment, intralesional, intrauterine or intravesical administration. Parenteral infusions include intramuscular, intravenous, intraarterial, intraperitoneal, or subcutaneous administration. Also envisaged is direct intratumoral administration. Preferred is intravenous or intratumoral administration. Dosing can be by any suitable route, e.g. by injections, such as intravenous or subcutaneous injections, depending in part on whether the administration is brief or chronic. Various dosing schedules including but not limited to single or multiple administrations over various timepoints, bolus administration, and pulse infusion are contemplated herein.

Intratumoral injection, or injection directly into the tumor vasculature is specifically contemplated for discrete, solid, accessible tumors. Local, regional or systemic administration also may be appropriate. For example, for tumors of >4 cm, the volume to be administered may be about 4-10 mL (suitably 10 mL), while for tumors of <4 cm, a volume of about 1-3 mL may be used (suitably 3 ml). In some embodiments, the volume of agent administered can be up to 25% or up to 33% of the tumor volume. Multiple injections delivered as single dose comprise about 0.1 to about 0.5 mL volumes. The viral particles may advantageously be contacted by administering multiple injections to the tumor, spaced at approximately 1 cm intervals. In the case of surgical intervention, the present compositions may be used preoperatively, to render an inoperable tumor subject to resection. Continuous administration also may be applied where appropriate, for example, by implanting a catheter into a tumor or into tumor vasculature. Such continuous perfusion may take place for a period from about 1-2 hours, to about 2-6 hours, to about 6-12 hours, to about 12-24 hours, to about 1-2 days, to about 1-2 wk or longer following the initiation of treatment. Generally, the dose of the therapeutic composition via continuous perfusion will be equivalent to that given by a single or multiple injections, adjusted over a period of time during which the perfusion occurs. It is further contemplated that limb perfusion may be used to administer therapeutic compositions, particularly in the treatment of melanomas and sarcomas.

The vector, virion, cell or pharmaceutical composition of the invention would be formulated, dosed, and administered in a fashion consistent with good medical practice. Factors for consideration in this context include the particular disorder being treated, the particular mammal being treated, the clinical condition of the individual patient, the cause of the disorder, the site of delivery of the agent, the method of administration, the scheduling of administration, and other factors known to medical practitioners. The vector, virion, cell or pharmaceutical composition need not be, but is optionally formulated with one or more agents currently used to prevent or treat the disorder in question. The effective amount of such other agents depends on the amount of the vector, virion, cell or pharmaceutical composition present in the formulation, the type of disorder or treatment, and other factors discussed above. These are generally used in the same dosages and with administration routes as described herein, or about from 1 to 99% of the dosages described herein, or in any dosage and by any route that is empirically/clinically determined to be appropriate.

For the prevention or treatment of disease, the appropriate dosage of the vector, virion, cell or pharmaceutical composition of the invention (when used alone or in combination with one or more other additional therapeutic agents) will depend on the type of disease to be treated, the type of the vector, virion, cell or pharmaceutical composition, the severity and course of the disease, whether the vector, virion, cell or pharmaceutical composition is administered for preventive or therapeutic purposes, previous therapy, the patient's clinical history and response to the vector, virion, cell or pharmaceutical composition, and the discretion of the attending physician. The vector, virion, cell or pharmaceutical composition is suitably administered to the patient at one time or over a series of treatments. Depending on the type and severity of the disease, about 1 μg/kg to 15 mg/kg (e.g. 0.1 mg/kg-10 mg/kg) of the vector, virion, cell or pharmaceutical composition can be an initial candidate dosage for administration to the patient, whether, for example, by one or more separate administrations, or by continuous infusion. One typical daily dosage might range from about 1 μg/kg to 100 mg/kg or more, depending on the factors mentioned above. For repeated administrations over several days or longer, depending on the condition, the treatment would generally be sustained until a desired suppression of disease symptoms occurs. One exemplary dosage of the vector, virion, cell or pharmaceutical composition would be in the range from about 0.05 mg/kg to about 10 mg/kg. Thus, one or more doses of about 0.5 mg/kg, 2.0 mg/kg, 4.0 mg/kg or 10 mg/kg (or any combination thereof) may be administered to the patient. Such doses may be administered intermittently, e.g. every week or every three weeks (e.g. such that the patient receives from about two to about twenty, or e.g. about six doses of the vector, virion, cell or pharmaceutical composition). An initial higher loading dose, followed by one or more lower doses may be administered. However, other dosage regimens may be useful. The progress of this therapy is easily monitored by conventional techniques and assays.

Alternatively, the vector, virion, cell or pharmaceutical composition of the invention may be delivered in a volume of from about 50 μL to about 10 mL including all numbers within the range, depending on the size of the area to be treated, the viral titer used, the route of administration, and the desired effect of the method. In one embodiment, the volume is about 50 μL. In another embodiment, the volume is about 70 μL. In another embodiment, the volume is about 100 μl another embodiment, the volume is about 125 μL. In another embodiment, the volume is about 150 μL. In another embodiment, the volume is about 175 μL. In yet another embodiment, the volume is about 200 μL. In another embodiment, the volume is about 250 μl. In another embodiment, the volume is about 300 μL. In another embodiment, the volume is about 450 μL. In another embodiment, the volume is about 500 μL. In another embodiment, the volume is about 600 μL. In another embodiment, the volume is about 750 μL. In another embodiment, the volume is about 850 μL. In another embodiment, the volume is about 1000 μL. In another embodiment, the volume is about 2000 μL. In another embodiment, the volume is about 3000 μL. In another embodiment, the volume is about 4000 μL. In another embodiment, the volume is about 5000 μL. In another embodiment, the volume is about 6000 μL. In another embodiment, the volume is about 7000 μL. In another embodiment, the volume is about 8000 μL. In another embodiment, the volume is about 9000 μL. In another embodiment, the volume is about 10000 μL. An effective concentration of a virion carrying a nucleic acid sequence encoding the desired transgene under the control of the cell-specific promoter sequence desirably ranges between about $10^8$ and $10^{13}$ vector genomes per milliliter (vg/mL). The infectious units may be measured as described in S. K. McLaughlin et al [26]. Preferably, the concentration is from about $1.5 \times 10^9$ vg/mL to about $1.5 \times 10^{12}$ vg/mL, and more preferably from about $1.5 \times 10^9$ vg/mL to about $1.5 \times 10^{11}$ vg/mL. In one embodiment, the effective concentration is about $1.5 \times 10^{10}$ vg/mL. In another embodiment, the effective concentration is about $1.5 \times 10^{11}$ vg/mL. In another embodiment, the effective concentration is about $2.8 \times 10^{11}$ vg/mL. In yet another embodiment, the effective concentration is about $1.5 \times 10^{12}$ vg/mL. In another embodiment, the effective concentration is about $1.5 \times 10^{13}$ vg/mL. It is desirable that the lowest effective concentration be utilized in order to reduce the risk of undesirable effects. Still other dosages in these ranges may be selected by the attending physician, taking into account the physical state of the subject, preferably human, being treated, the age of the subject, the particular type of cancer and the degree to which the cancer, if progressive, has developed.

It is understood that any of the above formulations or therapeutic methods may be carried out using any one of the vector, virion, cell or pharmaceutical composition of the invention.

In another aspect of the invention, an article of manufacture containing materials useful for the treatment, prevention and/or diagnosis of the disorders described above is provided. The article of manufacture comprises a container and a label or package insert on or associated with the container. Suitable containers include, for example, bottles, vials, syringes, IV solution bags, etc. The containers may be formed from a variety of materials such as glass or plastic. The container holds a composition which is by itself or combined with another composition effective for treating, preventing and/or diagnosing the disorder and may have a sterile access port (for example the container may be an intravenous solution bag or a vial having a stopper pierceable by a hypodermic injection needle). At least one active agent in the composition is the vector, virion, cell or pharmaceutical composition of the invention. The label or package insert indicates that the composition is used for treating the condition of choice. Moreover, the article of manufacture may comprise (a) a first container with a composition contained therein, wherein the composition comprises the vector, virion, cell or pharmaceutical composition of the invention; and (b) a second container with a composition contained therein, wherein the composition comprises a further cytotoxic or otherwise therapeutic agent. The article of manufacture in this embodiment of the invention may further comprise a package insert indicating that the compositions can be used to treat a particular condition, in particular cancer. Alternatively, or additionally, the article of manufacture may further comprise a second (or third) container comprising a pharmaceutically-acceptable buffer, such as bacteriostatic water for injection (BWFI), phosphate-buffered saline, Ringer's solution or dextrose solution. It may further include other materials desirable from a commercial and user standpoint, including other buffers, diluents, filters, needles, and syringes.

EXAMPLES

Example 1: Arenavirus GP Sequence Alignments

Arena virus RNA sequences of the S segment were retrieved from the NCBI nucleotide library in gene bank flat file format as follows: LCMV GP WE HPI (accession: AJ297484), MOPV GP (accession: JN561684), DANDV GP (accession: EU136038), IPPYV GP (accession: DQ328877), OLIVV GP (accession: U34248) and LATV (accession: AF485259). GPC glycoprotein sequences were obtained by translation of the GPC open reading frame coded by the S segment. Old World and New World clade C arenavirus GPC sequences were compared on nucleotide and protein level using the Geneious software package version 11.0.5 (Biomatters Ltd.).

N-linked glycosylation signals in the GP1 peptide of the glycoprotein GP were identified by the glycosylation signal sequence N×S or N×T. Numbering of the glycosylation signal sites corresponds to the parental sequence starting at the ATG methionine translation initiation codon (FIG. 1).

Absolute and relative sequence identities (% Seq Id) were calculated after multiple alignment of the nucleotide sequences or the corresponding GPC amino acid sequences (FIGS. 2 and 3). Sequences were aligned using MUSCLE [17] with a maximum number of eight iterations using a distance matrix by k-mer and pctid clustering. Subsequently, sequences were clustered using the UPMGA method. Sequence similarities of every arenavirus GPC protein compared to LCMV WE HPI were calculated from pairwise alignments using the blosum62 matrix with a threshold≥1.

Example 2: Arenavirus GPs can Complement for VSV-G

The GP glycoproteins of DANDV, MOPV as well as LATV and OLIVV were able to trans-complement VSV*MQΔG virus. The resulting VSV pseudotypes were able to infect BHK21CI.13 cells in a subsequent passage and showed increased GFP signals at different dilutions when compared to the mock control (FIG. 4A). The GFP signal that could be observed in BHK21CI.13 cells infected with supernatants of IPPYV GP-complemented VSV*MQΔG virus was comparable to the mock control and results from the input VSV*MQΔG virus. To confirm these results, BHK-566 cells which stably expresses the LCMV-GP were infected with the pseudotyped VSV*MQΔG viruses. Viruses trans-complemented with DANDV-GP, LATV-GP, MOPV-GP or OLIVV-GP were able to spread within the cell culture even at high dilutions, leading to a ubiquitous GFP expression after 48 h post infection (FIG. 4B). Cythopathic effects (CPE) of VSV*$M_{cp}$ΔG viruses trans-complemented with the GPs of DANDV, MOPW, IPPYV OLIVV and LATV confirmed the results obtained with the corresponding VSV*MQΔG pseudotypes and are summarized in FIG. 5.

For trans-complementation, $0.8-1\times10^6$ BHK21CI.13 cells were seeded in six-well plates one day before transfection. On the next day, BHK21CI.13 were transfected with 2.5 μg pCAG-DANDV-GP, pCAG-IPPYV-GP, pCAG-LATV-GP, pCAG-MOPV-GP or pCAG-OLIW-GP using TransIT-LT1 transfection reagent (Mirus Bio LCC, Madison, Wis. USA) according to the manufacturer's recommendations. 24 h post transfection, transiently transfected BHK21CI.13 cells were infected with VSV*$M_{cp}$ΔG or VSV*$M_O$ΔG [9], carrying the mutations M33A, M51R, V221F and S226R within the VSV matrix protein at an MOI of 3. One hour post infection, cells were washed twice with cGMEM (containing 10% FCS, 2% Glutamine and 1% Tryptose Phosphate Broth) and incubated for another 24 hours. Supernatants were harvested and cell debris was removed by centrifugation at 8000 rpm for 5 min in a bench-top centrifuge. Supernatants were then transferred in serial ten-fold dilutions to fresh BHK21CI.13 or BHK-566 cells, which stably expresses LCMV-GP WE HPI after lentiviral transduction, in 24-well plates. GFP expression from the vector or cytopathic effect was monitored after 24 h and 48 h on a Leica DM2500 fluorescent microscope. Pictures were taken using identical exposure times.

Example 3—Replication Kinetics

VSV-chimeric vectors that comprises the VSV vector backbone as described in WO 2010/040526 and the GPs of DANDV, MOPV, OLIVV and LATV were cloned. The GPs in the resulting chimeric VSV-G(x)-DANDV, -MOPV, -OLIVV and LATV vectors replace the GP of LCMV without any changes in the remaining VSV vector backbone. Although there were slightly differences in the replication kinetics of VSV-G(x)-DANDV and -MOPV (VSV-G(x)-

LATV and -OLIVV were not tested), both viruses replicate to titers higher than 1×10$^7$ TCID50/ml (FIG. 6A) or 1×10$^9$ genome copies/ml (FIG. 6B) after 30 hpi. With regard to their replication potential, VSV-G(x)-DANDV and -MOPV might be particularly suitable for OV cancer therapy.

For comparison of replication kinetics, Vero cell monolayers in a T75 cell culture flasks were infected with VSV-GP, VSV-G(x) DANDV or VSV-G(x) MOPV at an MOI of 0.05 or 0.0005. 500 µl supernatant of infected cells was collected at the indicated time points. Supernatant was centrifuged at approx. 2000 rpm for 5 min in a bench-top centrifuge to remove cell debris and stored at −80° C. until further processing. Analysis of viral titers by TCID50 assay [27] and of viral genomes by qPCR [28] was performed as described elsewhere.

Example 4—Tumor Cell Killing of VSV-G(x) Variants (FIG. 7)

Cell lines. Human Calu6 lung carcinoma cells were obtained from Dr. Edith Lorenz, OncoTyrol (Department of Internal Medicine, Hematology and Oncology, AG Zwierzina, Innsbruck). Cells were grown in DMEM medium with 10% fetal bovine serum, 2 mM L-Glutamine and 1% Penicillin/Streptomycin (Pen/Strep). The cells were sub-cultured every 2-3 days when they reach 80% confluency using EDTA-Trypsin 0.05%. 22Rv1 cells derived from a human prostate cancer were kindly provided by Prof. Z. Culig (Department of Urology, Medical University of Innsbruck). Cells were sub-cultured twice a week in RPMI1640 containing 10% FCS, 2 mM Glutamine, 10 mM HEPES, 1 mM sodium-pyruvate and 1% Pen/Strep. Adherent murine squamous cell carcinoma cells (SCCVII) were obtained from Dr. Lukas Mach (Department of Applied Genetics and Cell Biology, University of Natural Resources and Life Sciences, Vienna) Cells were grown in DMEM containing 10% FCS, 2 mM Glutamine, 0.1 mM non-essential amino-acids (NEAA), 1 mM sodium-pyruvate and 1% Pen/Strep. SCCVII cells were sub-cultured at a ratio of 1:10 three times a week using EDTA-Trypsin 0.05%. CT26CI.25 murine colon carcinoma cells derived from Balb/c that were stable transduced with a LacZ cassette disrupting the IFN-I antiviral response were obtained from ATCC (#CRL-2639). Cells were sub-cultured twice a week at a ratio of 1:10 in RPMI1640 containing 10% FCS, 2% Glutamine, 10 mM HEPES, 0.1 mM NEAA, 1 mM sodium-pyruvate 1% P/S and 400 µg/ml G418. LLC1 cells were established from a C57BL/6 mouse bearing a lung tumor after implantation of a primary Lewis Lung Carcinoma. The cells were obtained from ATCC (#CRL-1642) and cultured in DMEM containing 10% FCS, 4 mM Glutamine and 1% P/S. Confluent cell cultures were sub-cultured 1:6 to 1:10 every 3-4 days by resuspension of loosely attached cells.

VSV killing assay. Cells were seeded in 96-well plates and pre-incubated overnight with 10, 100, 500 and 1000 units of universal type-1 IFN (PBL, Piscataway, N.J., USA) in a volume of 100 µl/well. The following morning, cells were infected with VSV-GP, VSV-G(x) DANDV, VSV-G(x) MOPV or VSV-G(x) OLIW at an MOI of 0.1, 1, or 10 in a final volume of 120 µl/well. For each condition, quadruplicate samples were performed. As a positive, killing control cells were incubated with a final concentration of 6.67 mM of $H_2O_2$. Three days after infection, cells were analyzed for viability using an MTT (3-(4,5-dimethylthiazol-2-yl)-2,5-diphenyltetrazolium bromide)-based in vitro cytotoxicity assay (Sigma-Aldrich, Saint Louis, Mich., USA), according to the manufacturer's recommendations. Plates were measured in a conventional microplate reader at 550 nm, and blank values of wells without cells were subtracted. Values were normalized to mock-infected cells that were not pretreated with interferon (IFN), and represented as a percentage of viable cells.

Example 5: Neutralizing Antibodies after i.v. Treatment of NZW Rabbits

The study attempted to evaluate whether the VSV G(x) variants induce no neutralizing antibodies (nAb) or lower levels of nAbs compared to VSV-GP following 3 intravenous (i.v.) administrations in healthy tumor-free New Zealand White (NZW) rabbits. NZW rabbits were treated i.v. three times 14 days apart with 1×10$^9$ TCID$_{50}$ of VSV-GP or different VSV-G(x) candidates. nAb induction as well as body weight and temperature, viremia, whole blood count and blood chemistry were monitored at regular intervals following treatment as depicted in FIG. 9. The primary objective of this study was to monitor nAb induction by measuring nAb levels 10 days after each administration. The nAb assay is based on previously published work by Kaku et al. [29] J. Virol Methods (2012) 179(1):226-32. The VSV ΔG SEAP virus used in the nAb assays expresses the secreted embryonic alkaline phosphatase (SEAP) instead of the envelope glycoprotein G. This virus was complemented by LCMV GP or the respective other arenavirus glycoproteins ectopically expressed on the cell surface of the producer cell. These trans-complemented viruses were than tested for neutralization by the collected rabbit (FIG. 10).

Safety parameters such as the health status of the animals, including body weight (BW) and body temperature (BT), white blood cell (WBC) counts, blood chemistry (optional) and viremia (TCID50 and N-specific qPCR in plasma/blood) were secondary objectives.

Rabbit handling and housing: Crl:KBL(NZW) rabbits were purchased from Charles River Laboratories, (France). At arrival in the animal facility, rabbits were approx. 7 weeks old. The animals were housed in groups of two individuals in rabbit cages (R-Suite Enriched Rabbit Housing, Techniplast). Individuals were identified by ear tattoos. Rabbit housing was controlled daily and the overall health status was monitored. Food supply ad libitum and daily change of drinking water was guaranteed for the time period of the experiment. The rabbits were acclimated a minimum of 4 days before the rabbits were adapted to handling. Virus treatment started after the rabbits were acclimated and handled for at least one week.

Viruses and treatment of NZW rabbits: Virus dilutions were done with PBS. The final concentration of VSV-GP or VSV-G(x) solutions was 1×10$^9$ TCID50 per ml. Virus dilutions were kept on ice until shortly before injection. Rabbits were fixed by wrapping the animal in a cotton towel. The injection site of the tattooed left ear was shaved properly and then cleaned using a sterile alcohol swab. 1×10$^9$TCID$_{50}$ virus in 1 ml PBS were injected slowly into the left ear vein by a 29 gauge needle attached to a 1 ml syringe.

Rabbit monitoring: Body weight and body temperature were measured regularly according to the Schedule presented in FIG. 9. Temperature was measured rectally with a digital thermometer. Body weight was recorded using an Ultra MBSC balance.

Blood sampling and processing: Blood was collected from the ear artery using a 23G micro needle (Sarstedt, Germany). Before puncture of the artery, the ear was shaved properly and disinfected using an alcohol pad. A minimum of 2 ml blood was collected in a 15 ml tube containing 50

µl heparin (5000 IE/ml). 100 µl heparin blood was stored at −80° C. for analysis of viral titers by qPCR, the remaining blood was processed to heparin plasma (200 µl) for TCID50 determination or clinical chemistry (300 µl). At day −4 before the first treatment and at day 10 after each treatment cycle additional 2-3 ml blood was collected in a 15 ml Falcon for serum preparation. In addition, approx. 500 µl blood was collected in two pre-coated EDTA microvettes (Microvette® CB 300 K2E, Sarstedt, Germany). EDTA blood was used for whole blood count and a minimum of 100 µl was archived and used for qPCR. EDTA plasma was prepared from the second microvette and stored at −80° C. until use.

Viremia by $TCID_{50}$ and VSV-N specific qPCR: Viremia was measured by TCID50 assay in blood plasma after 8 h and consecutive three days after virus application of each treatment cycle (as described by Urbiola et al. [27]). For VSV-N specific qPCR, 100 µl of EDTA and Heparin blood frozen and stored at −80° C. for qPCR was used. RNA was isolated using a commercial available RNA isolation kit for blood samples. Determination of viral titers by qPCR was performed as described e.g. by Jenks et al. [28].

White Blood Count: White blood counts using EDTA blood were measured using the ScilVet ABC blood counter. Approximately 10-20 µl of fresh EDTA-blood was needed for the assay. Measurements were performed according to the manufacturer.

Sacrifice: Rabbits were anesthetized by Ketamine/Xylazine according to FELASA and GV SOLAS recommendations. After anesthesia the ear right ear vein was catheterized and rabbits were terminal bleed by heart puncture. Blood without anticoagulants and heparin blood was collected. Rabbits were released from anesthesia with a lethal dose of pentobarbital through the vein catheter according to FELASA and GV SOLAS recommendations. After the rabbits had been sacrificed, spleens were removed and splenocytes were isolated by standard procedures for optional downstream analysis (e.g. VSV-N specific T cell responses). Blood was processed to serum or plasma and aliquots were stored at −80° C. until use.

Neutralizing antibody (nAb) assay: Pre-immune sera collected before the first treatment at D-4 and serum samples taken 10d after each treatment cycle were analyzed for the presence of nAb directed against VSV-ΔG SEAP GP virus or pseudo-typed virus with a different glycoprotein variant. SEAP activity in the supernatant of infected BHK21CI.13 cells was measured by the enzymatic conversion of p-nitro-phenylphosphate (pNPP) to p-nitrophenyl which has a yellow color in solution by the virus coded SEAP. The color reaction was read in a conventional micro plate reader at 405 nm and served as indirect measurement of the infection rate by the SEAP expressing virus. Comparing serum and no serum-treated control samples the nAb assay indicated whether a serum sample contained neutralizing antibodies or not. In the absence of nAbs, the virus was not neutralized and able to infected BHK21CI.13 cells resulting in the expression of SEAP. In contrast, if the virus was neutralized by antibodies in the sera, the virus was not able to infect the cells and hence SEAP was not expressed.

One day before virus neutralization, BHK21CI.13 cells were seeded in a 96-well cell culture plate at a density of $1\times10^4$ cells in 100 µl cGMEM per well using a multi-channel dispenser pipette. To guarantee low inter assay variation cells were counted using the Luna cell counter (Logos Biosystems). Any other cell counting device that is based on the photographic analysis of cell numbers (e.g. Tecan reader) could be used. Counting cells with a CASY counter (OLS OMNI Life Science) or Kovar Glasstic slides is not recommended. Cells were incubate over night at 37° C., 6% CO2, 95% humidity. Cell culture plates were kept in a moisture chamber to prevent evaporation of the wells at the plate borders.

The next day, serial 1:5 serum dilutions starting at a lowest dilution of 1:5 were prepared first. Briefly, 200 µl cGMEM per well were added to a 96-well plate using a multi-channel dispenser pipette. 50 µl KL25 monoclonal ΔLCMV GP antibody at a concentration of 100 µg/ml (inter assay control) or heat inactivated (1 h, 56° C.) serum sample were added to 200 µl GMEM into the wells of row C of the 96-well plate and mixed by pipetting up and down several times. Five-fold serial dilutions starting at row C down to row H of the 96 well plate were done using a multichannel pipette: 50 µl from the wells in row C were transferred to the wells of the next row and mixed by pipetting several times up and down. 50 µl from the wells of row D were then added to the wells of the next row etc. until finished at row H. 175 µl of the serum dilutions of each well were transferred into a clean 96-well plate using a multichannel pipette. Serum dilutions were kept on ice. Row A and B of the 96-well plate served as no-infection control (row A) or no-serum control (row B).

Dilutions of pseudo-typed VSV ΔG SEAP virus were prepared in cGMEM at a MOI of 0.1 or 1, corresponding to $1\times10^3$ or $1\times10^4$ infectious particles per well, respectively, when $1\times10^4$ BHK21CI.13 cells were seeded one day before. The amount of virus needed for each triplicate in the nAb assay was calculated according to the following formulas:

$$\text{Volume of virus stock needed in [in µl]} = \frac{3.5*10^4 \text{ infectious particles } (MOI=1)}{\text{titer of virus stock } [TCID50/\text{ml}])} *1000 \text{ µl} * \text{number of wells}$$

and $$\text{Volume of } cGMEM \text{ [in µl]} = (175 \text{ µl} \times \text{number of wells}) - \text{Volume of virus stock needed in [in µl]}$$

175 µl virus solution were then added to each well of row B-H containing the 175 µl serial serum dilutions to make 350 µl serum/virus sample. Virus/serum samples were mix by pipetting up and down several times using a multichannel pipette. 175 µl cGMEM were added to the wells of row A (non-infection control). Serum/virus mixtures were incubated for 1 h on ice.

After incubation, 100 µl of the serum/virus sample was added in triplicate to BHK21CI.13 cells seeded in 96 well plates one day before. Cells should be at 80-90% confluency. BHK21CI.13 were incubated for additional 24 h at 37° C., 6% CO2 and 95% humidity.

On the next day, the nAb activity was measured as a function of SEAP activity. Briefly, the p-nitro-phenylphosphate (pNPP) substrate solution (SIGMA-FAST, Sigma Aldrich) was prepared according to the manufactures recommendations For each 96-well cell culture pNPP substrate solution was prepared by dissolving one buffer tablet and one pNPP substrate tablet in 21 ml sterile $H_2O$. 40 µl cell culture supernatant from the cells infected one day before were transferred into a new 96 well plate using a multichannel pipette. Then 200 µl of the pNNP substrate solution was added to the cell culture supernatant using a multichannel dispenser pipette. Plates were incubated at least 1 h at room temperature in the dark. The OD of the wells was read in a conventional micro plate reader at 405 nm. If the $OD_{405}$ of the no-serum control was lower than 1.0, incubation time was prolonged for an additional hour or up to 4 h, before OD measurements were repeated. Measured OD values were plotted versus serum dilutions. By non-linear curve fitting EC50 values were calculated using the GraphPad Prism 5 Software version 5.03 (GraphPad, San Diego, Calif. USA).

Example 6: Treatment of Calu6 Lung Tumor Xenograft Model (FIG. 11)

Recipient mice: Eight-week old female NMRI-Nude mice were purchased from Janvier (France). Animals were housed in individually ventilated cages in groups of 8 animals. For identification purpose, the mice were ear clipped. Before tumor engraftment the mice were acclimated for at least one week.

Tumor cells: Calu6 lung carcinoma cell line were obtained from Dr. Edith Lorenz, OncoTyrol (Department of Internal Medicine, Hematology and Oncology, ΔG Zwierzina, Innsbruck). Cells were grown in DMEM medium with 10% fetal bovine serum, 2 mM L-Glutamine and 1% Penicillin/Streptomycin. The cells were sub-cultured every 2-3 days when they reach 80% confluency using EDTA-Trypsin 0.05%. Cells were seeded at low cell numbers. 24 hrs before grafting into NRMI nude mice, cells were harvested, pooled and then passaged at a ratio 1:2 in T175 flasks.

On the day of engraftment, cells were detached using EDTA-Trypsin 0.05%, complete medium was added and cells were counted in a KOVA Glasstic slide (FisherScientific). To determine cell numbers, 10 µl cell suspension were mixed with 90 µl trypan blue solution by repeated pipetting in a 96-well plate. 20 µl of the counting mix was transferred to a KOVA Glasstic slide and cells in 3 squares (a, b, c) including the top and right gridline were counted omitting the blue labeled dead cells. The cell number per ml was determined by the following equation: ((count (a)+count (b)+count (c)))/3)×$10^4$×10=cells per ml. 5×$10^6$ cells per animal were transferred in a 50 ml Falcon tube and washed with PBS. The cells were resuspended in PBS to obtain a final concentration of 1×$10^8$ cells per ml. Subsequently, the cell suspension was divided in 1 ml aliquots and stored on ice for maximum 30 minutes before injection.

Engraftment of Calu6 cells into NMRI-Nude recipient mice: Calu6 cells were prepared as described above and resuspended by gently flicking the tube. Mice were anesthetized by isoflurane inhalation, the injection site was cleaned using a sterile alcohol swab. Using a 0.5 ml syringe with a 27G needle, 5×$10^6$ cells in 50 µl were administered subcutaneously (s.c.) in the right flank. Following injection of tumor cells, animals were checked bi-weekly for palpable lesions. After detecting a lesion, the animal was weighed and tumor size was measured. Tumors were measured using a caliper, values for length (cm) and width (cm) of the tumor were used to calculate the approximate tumor volume ($cm^3$) using the following formula: Volume=Length×(Width)$^2$× 0.4. Length was defined regardless of orientation to the animal axes as being the longer dimension.

Treatment by recombinant VSV vectors: When the mean size of tumors reached a volume between 0.05 and 0.07 $cm^3$, tumors were treated. 1 cage of 8 mice was allocated per group. Allocation of the cages was done to obtain similar mean and distribution of tumor size between the different groups. For the negative control group, 30 µl of PBS was injected i.t. For the other three treatment groups the final concentration of VSV-GP, VSV-GP(x) DANDV and VSV-GP(x) MOPV was 3.3×$10^8$ $TCID_{50}$ per ml. Dilutions of virus were done with PBS. Before injection, mice were anesthetized by isoflurane inhalation and the injection site was cleaned using a sterile alcohol swab. With a 0.1 ml syringe with a 29G needle, 1×$10^7 TCID_{50}$ VSV-GP, VSV-GP(x) DANDV or VSV-GP(x) MOPV in 30 µl was injected i.t. per tumor and animal. Treatments were repeated accordingly two times four days apart.

Monitoring Tumor growth: After treatment, the animal were examined and tumor size was measured at least twice a week with a maximal interval of 4 days. Tumors were measured as described above. If tumor size of one animal was measured in between for ethical reasons (e.g. just before sacrifice), at least all animal of this group were measured. Body weight of mice was determined once a week. The following endpoint criteria require euthanasia: (i) tumor volume exceeds 0.8 $cm^3$ (ii) mice show weight drop >20% or (iii) tumor ulcerates. Dates of sacrifice were used to calculate Kaplan-Mayer survival curves.

Example 7: Neurotoxicity of VSV-G(x)-DANDV and -MOPV

Wild type VSV infections can cause neurological symptoms when the virus gets access to the brain. These neurological complications include a severe encephalitis that can lead to death of the infected subject. The advantage of using a chimeric VSV-GP is that neuronal infection has been shown to be nearly completely absent rendering the VSV-backbone a safe oncolytic agent. The reason for the attenuated phenotype is thought to be due to an altered virus tropism facilitated via the viral envelope glycoprotein. Alterations or modifications of the GP glycoprotein might affect the tropism profile of VSV-GP therefore a neurotoxicity assessment of VSV-G(x) DANV and of VSV-G(x) MOPV was done. Both VSV-G(x) DANDV and VSV-G(x) MOPV did not show any signs of neurotoxicity after direct intracranial injection of Swiss CD1 mice (FIG. 13) as shown for VSV-LCMV GP. All control mice that received VSV-G DsRed died within the first week post infection.

Mice. 8 weeks old female Swiss CD-1 mice were purchased from Janvier (France). The animals were housed in individually ventilated cages in groups of 5 animals. Mice were ear clipped for identification purpose. The animals were acclimated for at least one week before start of the experiment.

Viruses. For each experimental group the designated virus stock was thawed on ice. The viruses were diluted to $1\times 10^6 TCID_{50}$/3 μl in PBS. The overall volume was 100 μl. 80 μl of the virus suspension was used for stereotactic injection of one group of mice (n=5). The remaining 20 μl were used for titration according to standard procedure. Serial ½ log dilutions of the sample covered the range of $1\times 10^5$-$1\times 10^{10}$ TCID50/ml. Virus titration was done within one hour after preparation of the virus dilution for stereotactic injection.

Stereotactic Injection. Mice were weighted and an appropriate dose of Ketamine and Xylazine (100 μl per 10 g body weight) was injected i.p. After anesthesia had started, the skull between eye line and occiput was shaved properly and the eyes were protected with ointment (bepanthen crème). The mouse was placed on the stereotactic frame by fixing the ear bars into the external auditory canal bilaterally and enclosing the upper jaw with the jaw bar. The skin was antiseptically cleaned with betaiodine in ethanol before a linear skin incision over the midline along the antero-posterior axis was done. The galea-periosteum was scraped with centrifugal motion away from the midline and the bone was dried with a cotton swab with the same motion. After identification of the Bregma, the needle tip of the Hamilton syringe fixed in the stereotactic frame was adjusted directly over the Bregma. Then the needle was moved to the target location 0.4 mm rostral and 2 mm right lateral of the Bregma and the position was marked with a scalpel tip and the needle was removed again. Using an electric drill a burr hole was made at the target location and bone chips and dust was removed from the lesion with a PBS moistened cotton swab.

The syringe was filled up with prepared virus solution using the fast reverse mode of the automated injector. After fast forwarding the syringe plunger until the fluid forms a little droplet at the tip of the needle, it was cleaned with a moistened cotton swab. After the needle tip was positioned to the burr hole 0.4 mm rostral and 2 mm right lateral of the Bregma, the needle was lowered down to the desired coordinate at 3 mm deep. Then automated injection procedure was started. After the injection was finished, the needle was left in place for 1 min to prevent back-flow through the needle trajectory. Then the needle was slowly withdrawn from brain and scull. Before the wound was closed using Vetbond 3M, the lesion was cleaned with PBS. Then the wound was wiped with betaiodine to prevent infection and the animal was transferred to recovery cage equipped with a heating pad to prevent hypothermia.

Post-operative analgesia was provided in accordance with FELASA requirements for postoperative analgesia in rodents. Briefly, 30 mg/kg/day of Ibuprofen was supplied per os in the drinking water for 72 hours. The animals were monitored from the completion of surgery until recumbence and full mobility was achieved. In the first day animals were monitor several times and then daily for opening, discharge, redness or other possible signs of infection at the wound site.

Evaluation of neurotoxicity. After treatment, the animals were examined twice a day for one week or until all VSV-G animals had been sacrificed. After that, animals were monitored daily until day 40 post treatment. Scoring parameters include body weight, motility, appearance and body condition as well as clinical and provoked behavioral signs of neurotoxicity (FIG. 12). A cumulative toxicity score was calculated by addition of the particular scores. Euthanasia was applied according to defined endpoint criteria.

```
SEQUENCES
                                                                              SEQ ID NO: 1
   1    atggggcagc tcataacaat gtttgaggct ttgccccaca tcatcgatga ggttatcaac
  61    atagttataa ttgtgcttgt gataataaca agcataaagg ctgtgtacaa ctttgctacc
 121    tgtggcatta ttgcactgat cagcttttgc ctcctagctg gcagatcttg tggtttatat
 181    ggtgtcaccg gtcctgacat ttacaaagga ctctaccaat tcaagtccgt ggagttcaac
 241    atgtcacagc tgaatttgac gatgcccaat gcatgttcag ccaacaactc ccaccattac
 301    atcagtatgg ggaagtctgg cttggagctg acttttacaa atgactccat catcagtcac
 361    aacttttgca acctgactga tgggttcaag aaaaaaacct ttgaccacac gctcatgagt
 421    atagtggcaa gcctacacct tagcatcaga ggaaacacca actataaggc tgtttcctgt
 481    gattttaaca atggaatcac catccaatac aacttgtctt tctctgatgc acaaagtgcc
 541    atcaatcaat gcagaacttt tagaggtaga gttctagaca tgttcaggac agctttcgga
 601    gggaagtaca tgaggtccgg ctatggttgg aagggctctg atgggaaaac tacttggtgc
 661    agtcagacca gttatcaata cctaatcata cagaacagaa catgggagaa tcactgtgag
 721    tacgccggtc cttttggcct ctcaagggtt ctctttgctc aggaaaaaac aaaatttctc
 781    actaggagat tggcagggac ttttacttgg acactgtcgg attcctcagg aactgagaac
 841    ccaggtgggt actgtctgac aaagtggatg cttatagctg ctgaactcaa gtgttttgga
 901    aacactgctg ttgctaaatg caatatcaat catgatgagg aattctgtga catgttgagg
 961    ctaattgatt acaacaaggc tgctctgaag aaattcaaag aagacgtaga gtctgccctt
1021    catctgttca agacaactgt gaattctcta atatctgacc agctgttaat gagaaatcat
1081    ttgagggact taatgggtgt gccctattgc aactactcga aattctggta cttggagcat
1141    gtgaaaacag gtgatacaag tgttccaaaa tgctggttgg tttctaacgc ctcatactta
1201    aatgaaacac atttcagtga ccagatagag caggaagcag acaacatgat cactgagatg
1261    ctcaggaaag attacatcaa gaggcaggga agcactcctt tggcactgat ggacctatta
1321    atgttctcta catcggcata tttaatcagt gttttccttc atctgatgaa aatcccaact
1381    catagacaca ttaaggtgg cacatgccct aagccacaca ggttaactag taaaggcatc
1441    tgtagctgtg gtgcgttcaa agtgccagga gtgaaaacag tctggaagag acgctga >Danedong NC_010248.1
```

-continued

SEQ ID NO: 2

MGQLITMFEALPHIIDEVINIVIIVLVIITSIKAVYNFATCGIIALISFCLLAGRSCGLYGVTGPDIYKGLYQFKSVEFNMSQLNLTMPNACSA
NNSHHYISMGKSGLELTFTNDSIISHNFCNLTDGFKKKTFDHTLMSIVASLHLSIRGNTNYKAVSCDFNNGITIQYNLSFSDAQSAINQCRTFR
GRVLDMFRTAFGGKYMRSGYGWKGSDGKTTWCSQTSYQYLIIQNRTWENHCEYAGPFGLSRVLFAQEKTKFLTRRLAGTFTWTLSDSSGTENPG
GYCLTKWMLIAAELKCFGNTAVAKCNINHDEEFCDMLRLIDYNKAALKKFKEDVESALHLFKTTVNSLISDQLLMRNHLRDLMGVPYCNYSKFW
YLEHVKTGDTSVPKCWLVSNGSYLNETHFSDQIEQEADNMITEMLRKDYIKRQGSTPLALMDLLMFSTSAYLISVFLHLMKIPTHRHIKGGTCP
KPHRLTSKGICSCGAFKVPGVKTVWKRR

SEQ ID NO: 3

```
   1    atgggg cagatagtca ccttctttca agaggtgcca cacatccttg aagaagtgat
  61    gaacattgtg ctgatgaccc tctcaatctt ggccatccta aagggcatct acaatgtgat
 121    gacctgtgga atcatcggtt tgataacatt tttgttcttg tgtgggagat catgctcaag
 181    catctataag gacaactatg agttcttctc tctcgacctc gacatgtctt cactgaatgc
 241    aacgatgcct ctcctgctgc aaagaacaa ctcccatcac tacatccaag ttgggaatga
 301    gacaggccta gagctgacat tgacaaacac tagcataatt gatcataagt tttgcaacct
 361    gtctgatgct cacaggagga atctttatga caaagcactt atgtcaatct tgacaacatt
 421    ccacctaagc attccagatt ttaaccaata tgaggcaatg tcatgtgatt ttaacggagg
 481    gaagatctca attcaataca acctgtccca ctcaaattat gtggatgccg gcaaccactg
 541    tggcactatt gcaaatggca ttatgatgt ttttagaaga atgtattgga gcacctccct
 601    ttcggttgcc tctgacataa gtgggactca atgcatacag accgattata agtatttgat
 661    tattcagaac acatcatggg aggatcattg catgttctca agaccctcac ccatgggatt
 721    tttaagccct ctgtcacaga gaaccaggaa tttctacatc tcaagaagac ttttgggtct
 781    ttttacatgg actttgagtg actcggaagg gaacgacatg ccaggtggtt actgtctcac
 841    aaggtctatg ctaatagggc ttgatctgaa atgctttggg aacactgcca ttgcgaagtg
 901    taatcaggca catgatgaag aattctgtga catgctccgc ttttttgatt ttaataaaca
 961    agcaattagc aaactgaggt ctgaagttca gcagagcata aatttgataa ataaagctgt
1021    caacgccctc atcaatgatc aactggtcat gaggaaccat ttgagagatc taatgggtat
1081    tccttattgc aactactcta gttttggta cttgaatgat actaggacag ggagaacatc
1141    cctcccaaag tgttggcttg tgaccaatgg gtcatacccta aatgaaaccc agttctcaac
1201    agaaattgag caagaagcca ataacatgtt cactgacatg ttgaggaagg agtatgagaa
1261    aaggcagagc acaacacctc tggggttagt agatctttt gttttctcca ctagcttta
1321    tttgatctcc gtgttcctcc acctaatcaa aattccaaca catagacaca taaaaggcaa
1381    gccttgcccg aaaccacaca gactcaatca catggcaatc tgttcctgtg gcttctataa
1441    gcaaccaggt ctccccacac aatggaaaag gtga
```

>Mopeia JN_561684.1

SEQ ID NO: 4

MGQIVTFFQEVPHILEEVMNIVLMTLSILAILKGIYNVMTCGIIGLITFLFLCGRSCSSIYKDNYEFFSLDLDMSSLNATMPLSCSKNNSHHYI
QVGNETGLELTLTNTSIIDHKFCNLSDAHRRNLYDKALMSILTTFHLSIPDFNQYEAMSCDFNGGKISIQYNLSHSNYVDAGNHCGTIANGIMD
VFRRMYWSTSLSVASDISGTQCIQTDYKYLIIQNTSWEDHCMFSRPSPMGFLSLLSQRTRNFYISRRLLGLFTWTLSDSEGNDMPGGYCLTRSM
LIGLDLKCFGNTAIAKCNQAHDEEFCDMLRLFDFNKQAISKLRSEVQQSINLINKAVNALINDQLVMRNHLRDLMGIPYCNYSKFWYLNDTRTG
RTSLPKCWLVTNGSYLNETQFSTEIEQEANNMFTDMLRKEYEKRQSTTPLGLVDLFVFSTSFYLISVFLHLIKIPTHRHIKGKPCPKPHRLNHM
AICSCGFYKQPGLPTQWKR

```
                                                                    SEQ ID NO: 5
   1                                                       a tgggacagat
  61    aataaccttc tttcaggaag tgcctcacat tatagaggaa gtcatgaaca ttgttctgat
 121    caccctatcc ctcttggcta tcttgaaggg tgtgtacaat gtcatgactt gtggtctgat
 181    tggattgatt tcctttctct tactgtgtgg aagtcctgc tctctaatct acaaggacac
 241    atataacttc tcatccattg aacttgacct ctcacacctc aacatgacat tgcccatgtc
 301    ctgcagccga aacaactcac accactatgt cttcttcaac ggatctggct tagagatgac
 361    attcactaac gattcacttc ttaaccacaa attctgcaat ctttcagacg cccataaaaa
 421    gaatctttac gatcatgcgc taatgggcat tgtcacaact ttccacttgt caatcccgaa
 481    cttcaatcaa tacgaagcaa tggcctgtga cttcaatgga gggaatatta gcattcaata
 541    caacttgagc cacaatgatc gaacagatgc aatgaaccac tgtggcactg tagctaatgg
 601    tgtactggat gctttttata ggttccattg gggcagaaat ataacctaca tcgctcagtt
 661    gccaaatggc gacggcactg gcagatggac attctgttat gccacaagtt ataagtacct
 721    ggttatccaa acattagct gggctgatca ttgtcaaatg tcaagaccaa ctcccattgg
 781    ctttgctagc attctgagcc aacggattag gagcatttac atttcaagac gactgatgag
 841    cacattcact tggtctctat ccgacagttc aggtactgag aatccaggtg gctattgtct
 901    caccagatgg atgcttttg cggctgactt gaaatgcttt ggaaacacag ccattgccaa
 961    atgtaacctg aatcatgatg aagagttctg cgacatgttg aggcttattg acttcaacaa
1021    gcaagccttg aaaacattca atcggaggt taaccatggt ctacaactaa ttacaaaggc
1081    gattaatgcc ttgatcaatg accaactcat tatgaagaat cacttaaggg acctaatggg
1141    tatcccttat tgcaattatt caaaattctg gtatctaaat gacacaagaa caggtagagt
1201    ctctctgcct aagtgctgga tgatcagcaa cgggacctat ctaaatgaga ctcatttttc
1261    tgatgagatt gaacaggaag cagacaatat gatcacagaa atgttgagaa aagagtatca
1321    agaaagacaa gggaagaccc cattgggtct agttgatctt tttatttta gcacaagctt
1381    ttattcaatc acagtgttcc tccatctcat aaagattcca acgcacagac acatcgtggg
1441    acaagggtgt cccaagccac acagactaaa cagtagagca atctgctcct gtggtgccta
1501    taaacagccg ggactaccca ccaagtggaa gcgctga
```

>Ippy NC_007905.1

SEQ ID NO: 6

MGQIITFFQEVPHIIEEVMNIVLITLSLLAILKGVYNVMTCGLIGLISFLLLCGKSCSLIYKDTYNFSSIELDLSHLNMTLPMSCSRNNSHHYV
FFNGSGLEMTFTNDSLLNHKFCNLSDAHKKNLYDHALMGIVTTFHLSIPNFNQYEAMACDFNGGNISIQYNLSHNDRTDAMNHCGTVANGVLDA
FYRFHWGRNITYIAQLPNGDGTGRWTFCYATSYKYLVIQNISWADHCQMSRPTPIGFASILSQRIRSIYISRRLMSTFTWSLSDSSGTENPGGY
CLTRWMLFAADLKCFGNTAIAKCNLNHDEEFCDMLRLIDFNKQALKTFKSEVNHGLQLITKAINALINDQLIMKNHLRDLMGIPYCNYSKFWYL
NDTRTGRVSLPKCWMISNGTYLNETHFSDEIEQEADNMITEMLRKEYQERQGKTPLGLVDLFIFSTSFYSITVFLHLIKIPTHRHIVGQGCPKP
HRLNSRAICSCGAYKQPGLPTKWKR

```
                                                                    SEQ ID NO: 7
  61                                                       a tgggtcaagt gattggattc ttccaatcat
 121    tgcccgagat tattaatgaa gcgttgaaca ttgctctgat ctgtgtggct ctgcttgcca
 181    caatcaaggg aatggtcaac atctggaaat ctggtttgat acagctcctc ttcttcctca
 241    cattggcagg aagaagttgt tctcattctt ttacaattgg aagatttcat gaatttcaga
 301    gtgtgacagt taactttaca cagttcatgt cctatgctcc aagctcttgc tcagtaaaca
 361    acacccacca ttatttcaaa ggtccccaaa acaccacctg gggtcttgag ttgactttga
```

-continued

```
 421   ctaatgaatc aatgataaac atcaccaatt ccatgagggt cttcactaac attcatcaca
 481   atgtaaccaa ttgcgtgcag aacatttccg aacatgaggg tgtgctcaaa tggctgcttg
 541   agacaatgca cctaagcatc agcaagccag aaaacacat cgcacctgtc atgtgtgaga
 601   gacaaaaggg gttgctcatc gagtacaatc tcactatgac caaagaccac cacccaaatt
 661   attggaatca agtcttgtat ggactggcta aattattggg ctcaagtaag cgtttgtggt
 721   ttggcgcatg taacaaggct gactgtcaga tgcaatcaga ccaccagcac ataaaatgca
 781   attactcgaa ttgcaaaggt tacaccagct ttaaatactt aattattcaa ataccactt
 841   gggaaaacca ttgtgagtat aaccatctga acaccatcca ccttctcatg agctctattg
 901   gccaatcctt tatcacaaga aggcttcaag cctttttaac ctggacactt tctgatgcac
 961   tagggaatga ccttcctggg ggatactgtc ttgaacagtg ggctgtggtg tggtttggca
1021   taaagtgttt tgataacaca gcaatggcca agtgcaatca gaatcatgat tcagagtttt
1081   gtgatatgct aaggcttttt gattacaata gaaatgctat tcagagctta aatgatcaat
1141   ctcaagccag attaaacctt ttaactaaca ccattaattc acttgtctct gacaatttac
1201   taatgaaaaa taagctaaga gaactaatga acgtgccata ctgtaattac actagattct
1261   ggtttattaa tgatacaaag aatggtagac acactcttcc acaatgttgg ttggtatcag
1321   atggttcgta cttgaatgaa accagattca gaactcaatg gctaagtgaa agtaactctt
1381   tatacacaga aatgctgact gaagaatatg aaaaaagaca gggtagaaca cctctttctt
1441   tagtggacct atgcttttgg tcaactctct tttacatatc aacattattt gcgcatttag
1501   tgggtttccc aactcacaga caccttatag gtgagggctg cccaaaacca cacagattaa
1561   cagggtcagg gatctgctca tgtggacatt atggtattcc aggtaaacca gtcagatgga
1621   caaagatgtc aaggtga
```

>Latino NC_010758.1

SEQ ID NO: 8

MGQVIGFFQSLPEIINEALNIALICVALLATIKGMVNIWKSGLIQLLFFLTLAGRSCSHSFTIGRFHEFQSVTVNFTQFMSYAPSSCSVNNTHH
YFKGPQNTTWGLELTLTNESMINITNSMRVFTNIHHNVTNCVQNISEHEGVLKWLLETMHLSISKPGKHIAPVMCERQKGLLIEYNLTMTKDHH
PNYWNQVLYGLAKLLGSSKRLWFGACNKADCQMQSDHQHIKCNYSNCKGYTSFKYLIIQNTTWENHCEYNHLNTIHLLMSSIGQSFITRRLQAF
LTWTLSDALGNDLPGGYCLEQWAVVWFGIKCFDNTAMAKCNQNHDSEFCDMLRLFDYNRNAIQSLNDQSQARLNLLTNTINSLVSDNLLMKNKL
RELMNVPYCNYTRFWFINDTKNGRHTLPQCWLVSDGSYLNETRFRTQWLSESNSLYTEMLTEEYEKRQGRTPLSLVDLCFWSTLFYISTLFAHL
VGFPTHRHLIGEGCPKPHRLTGSGICSCGHYGIPGKPVRWTKMSR

SEQ ID NO: 9

```
  61                                                              atgg
 121   gtcaagtcat tgggttcttc caatccttac ccaacatcat taatgaggca ctaaacattg
 181   ccctcatctg tgtggcatta attgccatat tgaaaggtat tgttaacata tggaaatcag
 241   gtctgattca gctgttcata ttcctcatcc tagcggggag gagctgttct cacacctttc
 301   agattggccg aaaccatgag ttccaaagta tcactctaaa cttcacacag ttttttgggct
 361   acgcacccag ctcctgttct gttaacaaca ctcatcacta ctttagaggt cctggcaatg
 421   tctcttgggg catcgagctc acattgacca caactccgt gatcaatgca agcaactcac
 481   tgaaggtgtt caccaacatt caccacaaca tcaccaactg cgttcagaat atcgatgagc
 541   aagaccacct aatgaaatgg ctcatagaaa caatgcatct cagatcatg aaaccaggaa
 601   agagactacc accaatcctg tgtgagaaag acaaagggtt actaattgaa tacaacctaa
 661   ccaacattgc atctcgcgaa gaaagcact ctgagtactg agccaactt ctctatggtc
 721   tatcaaaact attaggctcc agtaagtcat tgtggtttga ttactgtcag agagcagatt
```

```
-continued
 781   gcatgatgca agagcacagc tcacacttga agtgcaacta ctcagagtgt tctggccata 841   ccaccttcaa atacctcatt ctacaaaaca ccacttggga gaaccattgt gagttcaacc 901   atctaaacac aattcacctg ttgatgagct ctactggtca gtctttcata actagaaggt 961   tgcaggcttt tctaacttgg actttgtcag atgctacagg caatgacctc cctgggggtt 1021   actgcctaga gcagtgggcc atagtttggg caggcatcaa gtgctttggg aacacagcag 1081   ttgcaaagtg taatcaaaat catgactctg aattctgtga catgttgagg ctctttgatt 1141   acaataggaa tgctattaag agtctgaatg atcagtctca aagtcgtcta aatcttctaa 1201   caaatacaat aaattcactg atttcggata atctgttgat gaaaaacaag ttggctgaga 1261   taatgaacat tccgtattgc aattacacaa aattctggta catcaacgac actaggactg 1321   gaaggcacac ccttccccaa tgctggttaa tctcaaatgg gtcttacttg aatgagacta 1381   aattcagaac tcagtggctg tcagagagca atgcactcta tacagaaatg ctaacagaag 1441   attatgacaa aaggcagggt agcacaccac tctccttggt tgatctatgt ttttggtcaa 1501   ccttattcta tgtgaccaca ttgtttgctc atcttgttgg tttcccaaca cacagacaca 1561   tcttagatgg tccttgccct aaacccaca gattaacaaa gaaaggaatt tgttcctgtg 1621   gacattttgg aataccgggc aaacctgttc gatgggtgaa acgatcacgg tga
```

>Oliveros NC_010248.1

SEQ ID NO: 10

MGQVIGFFQSLPNIINEALNIALICVALIAILKGIVNIWKSGLIQLFIFLILAGRSCSHTFQIGRNHEFQSITLNFTQFLGYAPSSCSVNNTHH

YFRGPGNVSWGIELTLTNNSVINASNSLKVFTNIHHNITNCVQNIDEQDHLMKWLIETMHLQIMKPGKRLPPILCEKDKGLLIEYNLTNIASRE

EKHSEYWSQLLYGLSKLLGSSKSLWFDYCQRADCMMQEHSSHLKCNYSECSGHTTFKYLILQNTTWENHCEFNHLNTIHLLMSSTGQSFITRRL

QAFLTWTLSDATGNDLPGGYCLEQWAIVWAGIKCFGNTAVAKCNQNHDSEFCDMLRLFDYNRNAIKSLNDQSQSRLNLLTNTINSLISDNLLMK

NKLAEIMNIPYCNYTKFWYINDTRTGRHTLPQCWLISNGSYLNETKFRTQWLSESNALYTEMLTEDYDKRQGSTPLSLVDLCFWSTLFYVTTLF

AHLVGFPTHRHILDGPCPKPHRLTKKGICSCGHFGIPGKPVRWVKRSR

BIBLIOGRAPHY

[1] Sean E. Lawler, Maria-Carmela Speranza, Choi-Fong Cho et al. Oncolytic Viruses in Cancer Treatment JAMA Oncol. 2017; 3(6):841-849.

[2] Liu B L, Robinson M, Han Z Q, et al. ICP34.5 deleted herpes simplex virus with enhanced oncolytic, immune stimulating, and anti-tumour properties. Gene Ther. 2003; 10(4):292-303.

[3] Guse K, Cerullo V, Hemminki A. Oncolytic vaccinia virus for the treatment of cancer. Expert Opin Biol Ther. 2011; 11(5):595-608.

[4] Weller S K, Coen D M. Herpes simplex viruses: mechanisms of DNA replication. Cold Spring Harb Perspect Biol. 2012; 4(9):a013011.

[5] Lichty B D, Power A T, Stojdl D F, Bell J C. Vesicular stomatitis virus: re-inventing the bullet. Trends Mol Med. 2004; 10(5):210-216.

[6] Hastie E, Grdzelishvili V Z. Vesicular stomatitis virus as a flexible platform for oncolytic virotherapy against cancer. J Gen Virol. 2012; 93(pt 12):2529-2545.

[7] Russell S J, Peng K W. Measles virus for cancer therapy. Curr Top Microbiol Immunol. 2009; 330:213-241.

[8] Zamarin D, Palese P. Oncolytic Newcastle disease virus for cancer therapy: old challenges and new directions. Future Microbiol. 2012; 7(3):347-367.

[9] Alexander Muik, Inna Kneiske, Marina Werbizki, et al. Pseudotyping Vesicular Stomatitis Virus with Lymphocytic Choriomeningitis Virus Glycoproteins Enhances Infectivity for Glioma Cells and Minimizes Neurotropism. J Virol. 2011 June; 85(11): 5679-5684.

[10] Reinhard Tober, Zoltan Banki, Lisa Egerer, et al. VSV-GP: a Potent Viral Vaccine Vector That Boosts the Immune Response upon Repeated Applications J Virol. 2014 May; 88(9): 4897-4907.

[11] R Tober, Z Banki, A Ejaz, et al. The viral vector vaccine VSV-GP boosts immune response upon repeated applications. Retrovirology. 2012; 9 (Suppl 2): P301. Published online 2012 Sep. 13.

[12] Palacios G, Druce J, Du L, et al. A New Arenavirus in a cluster of fatal transplant-associated diseases. N Engl J Med. 2008; 358:991-998

[13] Georges A J, Gonzalez J P, Abdul-Wahid S, Saluzzo J F, Meunier D M, McCormick J B. Antibodies to Lassa and Lassa-like viruses in man and mammals in the Central African Republic. Trans R Soc Trop Med Hyg. 1985; 79(1):78-9.

[14] Digoutte, Rapport de l'Institut Pasteur de Bangui (1970), p. 59.

[15] Murphy F A, Webb P A, Johnson K M, Whitfield S G, Chappell W A. Murphy et al. Arenoviruses in Vero cells: ultrastructural studies. J. Virol 6 (1970), pp. 507-518.

[16] Bowen M D, Peters C J, Mills J N, Nichol S T. Oliveros virus: a novel arenavirus from Argentina. Virology. 1996 Mar. 1; 217(1):362-6.

[17] Edgar R C. MUSCLE: multiple sequence alignment with high accuracy and high throughput. Nucleic Acids Res. 2004 Mar. 19; 32(5):1792-7.

[18] Beyer W R, Miletic H, Ostertag W, von Laer D. Recombinant expression of lymphocytic choriomeningitis virus strain W E glycoproteins: a single amino acid makes the difference. J Virol. 2001 January; 75(2):1061-4.
[19] Owens R J, Rose J K. Cytoplasmic domain requirement for incorporation of a foreign envelope protein into vesicular stomatitis virus. J Virol. 1993 January; 67(1): 360-5.
[20] Tani H, Komoda Y, Matsuo E, Suzuki K, Hamamoto I, Yamashita T, Moriishi K, Fujiyama K, Kanto T, Hayashi N, Owsianka A, Patel A H, Whitt M A, Matsuura Y. Replication-competent recombinant vesicular stomatitis virus encoding hepatitis C virus envelope proteins. J Virol. 2007 August; 81(16):8601-12. Epub 2007 Jun. 6.
[21] Ge J, Wen Z, Wang X, Hu S, Liu Y, Kong X, Chen H, Bu Z. Generating vesicular stomatitis virus pseudotype bearing the severe acute respiratory syndrome coronavirus spike envelope glycoprotein for rapid and safe neutralization test or cell-entry assay. Ann N Y Acad Sci. 2006 October; 1081:246-8.
[22] Garbutt M, Liebscher R, Wahl-Jensen V, Jones S, Möller P, Wagner R, Volchkov V, Klenk H D, Feldmann H, Ströher U. Garbutt et al. Properties of replication-competent vesicular stomatitis virus vectors expressing glycoproteins of filoviruses and arenaviruses. J Virol. 2004 May; 78(10):5458-65.
[23] Miletic H, Fischer Y, Litwak S, Giroglou T, Waerzeggers Y, Winkeler A, Li H, Himmelreich U, Lange C, Stenzel W, Deckert M, Neumann H, Jacobs A H, von Laer D. Bystander killing of malignant glioma by bone marrow-derived tumor-infiltrating progenitor cells expressing a suicide gene. Mol Ther. 2007 July; 15(7):1373-81.
[24] Fischer Y H, Miletic H, Giroglou T, Litwak S, Stenzel W, Neumann H, von Laer D. A retroviral packaging cell line for pseudotype vectors based on glioma-infiltrating progenitor cells. J Gene Med. 2007 May; 9(5):335-44.
[25] Remington's Pharmaceutical Sciences 16th edition, Osol, A. Ed. (1980)
[26] McLaughlin S K[1], Collis P, Hermonat P L, Muzyczka N. Adeno-associated virus general transduction vectors: analysis of proviral structures. J Virol. 1988 June; 62(6): 1963-73.
[27] Urbiola C, Santer F R, Petersson M, van der Pluijm G, Horninger W, Erlmann P, Wollmann G, Kimpel J, Culig Z, von Laer D. Oncolytic activity of the rhabdovirus VSV-GP against prostate cancer. Int J Cancer. 2018 Apr. 26.
[28] Jenks N, Myers R, Greiner S M, Thompson J, Mader E K, Greenslade A, Griesmann G E, Federspiel M J, Rakela J, Borad M J, Vile R G, Barber G N, Meier T R, Blanco M C, Carlson S K, Russell S J, Peng K W. Safety studies on intrahepatic or intratumoral injection of oncolytic vesicular stomatitis virus expressing interferon-beta in rodents and nonhuman primates. Hum Gene Ther. 2010 April; 21(4):451-62.
[29] Kaku Y, Noguchi A, Marsh G A, Barr J A, Okutani A, Hotta K, Bazartseren B, Fukushi S, Broder C C, Yamada A, Inoue S, Wang L F Second generation of pseudotype-based serum neutralization assay for Nipah virus antibodies: sensitive and high-throughput analysis utilizing secreted alkaline phosphatase. J Virol Methods. 2012 January; 179(1):226-32.

---

The invention claimed is:

1. VSV chimeric vector, comprising a gene coding for a glycoprotein GP of the Dandenong virus and lacking a functional gene coding for envelope protein G of the VSV.

2. The vector of claim 1, wherein the vector further comprises at least one transgene.

3. A pharmaceutical composition comprising the VSV chimeric vector of claim 1.

* * * * *

SEQUENCE LISTING

```
<160> NUMBER OF SEQ ID NOS: 10

<210> SEQ ID NO 1
<211> LENGTH: 1497
<212> TYPE: DNA
<213> ORGANISM: Dandenong virus

<400> SEQUENCE: 1
atggggcagc tcataacaat gtttgaggct ttgccccaca tcatcgatga ggttatcaac    60
atagttataa ttgtgcttgt gataataaca agcataaagg ctgtgtacaa ctttgctacc   120
tgtggcatta ttgcactgat cagcttttgc ctcctagctg gcagatcttg tggtttatat   180
ggtgtcaccg gtcctgacat ttacaaagga ctctaccaat tcaagtccgt ggagttcaac   240
atgtcacagc tgaatttgac gatgcccaat gcatgttcag ccaacaactc ccaccattac   300
atcagtatgg ggaagtctgg cttggagctg acttttacaa atgactccat catcagtcac   360 aactttttgca acctgactga tgggttcaag aaaaaaacct ttgaccacac gctcatgagt   420
atagtggcaa gcctacacct tagcatcaga ggaaacacca actataaggc tgtttcctgt   480
gattttaaca atggaatcac catccaatac aacttgtctt tctctgatgc acaaagtgcc   540
atcaatcaat gcagaacttt tagaggtaga gttctagaca tgttcaggac agctttcgga   600
gggaagtaca tgaggtccgg ctatggttgg aagggctctg atgggaaaac tacttggtgc   660
agtcagacca gttatcaata cctaatcata cagaacagaa catgggagaa tcactgtgag   720
tacgccggtc cttttggcct ctcaaggtt ctctttgctc aggaaaaaac aaaatttctc   780
actaggagat tggcagggac ttttacttgg acactgtcgg attcctcagg aactgagaac   840
ccaggtgggt actgtctgac aaagtggatg cttatagctg ctgaactcaa gtgttttgga   900
```

```
aacactgctg ttgctaaatg caatatcaat catgatgagg aattctgtga catgttgagg    960
ctaattgatt acaacaaggc tgctctgaag aaattcaaag aagacgtaga gtctgccctt   1020
catctgttca agacaactgt gaattctcta atatctgacc agctgttaat gagaaatcat   1080
ttgagggact taatgggtgt gccctattgc aactactcga aattctggta cttggagcat   1140
gtgaaaacag gtgatacaag tgttccaaaa tgctggttgg tttctaacgg ctcatactta   1200
aatgaaacac atttcagtga ccagatagag caggaagcag acaacatgat cactgagatg   1260
ctcaggaaag attacatcaa gaggcaggga agcactcctt tggcactgat ggacctatta   1320
atgttctcta catcggcata tttaatcagt gttttccttc atctgatgaa aatcccaact   1380
catagacaca ttaaaggtgg cacatgccct aagccacaca ggttaactag taaaggcatc   1440
tgtagctgtg gtgcgttcaa agtgccagga gtgaaaacag tctggaagag acgctga     1497
```

<210> SEQ ID NO 2
<211> LENGTH: 498
<212> TYPE: PRT
<213> ORGANISM: Dandenong virus

<400> SEQUENCE: 2

```
Met Gly Gln Leu Ile Thr Met Phe Glu Ala Leu Pro His Ile Ile Asp
1               5                   10                  15

Glu Val Ile Asn Ile Val Ile Val Leu Val Ile Ile Thr Ser Ile
            20                  25                  30

Lys Ala Val Tyr Asn Phe Ala Thr Cys Gly Ile Ile Ala Leu Ile Ser
        35                  40                  45

Phe Cys Leu Leu Ala Gly Arg Ser Cys Gly Leu Tyr Gly Val Thr Gly
    50                  55                  60

Pro Asp Ile Tyr Lys Gly Leu Tyr Gln Phe Lys Ser Val Glu Phe Asn
65                  70                  75                  80

Met Ser Gln Leu Asn Leu Thr Met Pro Asn Ala Cys Ser Ala Asn Asn
                85                  90                  95

Ser His His Tyr Ile Ser Met Gly Lys Ser Gly Leu Glu Leu Thr Phe
            100                 105                 110

Thr Asn Asp Ser Ile Ile Ser His Asn Phe Cys Asn Leu Thr Asp Gly
        115                 120                 125

Phe Lys Lys Lys Thr Phe Asp His Thr Leu Met Ser Ile Val Ala Ser
    130                 135                 140

Leu His Leu Ser Ile Arg Gly Asn Thr Asn Tyr Lys Ala Val Ser Cys
145                 150                 155                 160

Asp Phe Asn Asn Gly Ile Thr Ile Gln Tyr Asn Leu Ser Phe Ser Asp
                165                 170                 175

Ala Gln Ser Ala Ile Asn Gln Cys Arg Thr Phe Arg Gly Arg Val Leu
            180                 185                 190

Asp Met Phe Arg Thr Ala Phe Gly Gly Lys Tyr Met Arg Ser Gly Tyr
        195                 200                 205

Gly Trp Lys Gly Ser Asp Gly Lys Thr Thr Trp Cys Ser Gln Thr Ser
    210                 215                 220

Tyr Gln Tyr Leu Ile Ile Gln Asn Arg Thr Trp Glu Asn His Cys Glu
225                 230                 235                 240

Tyr Ala Gly Pro Phe Gly Leu Ser Arg Val Leu Phe Ala Gln Glu Lys
                245                 250                 255

Thr Lys Phe Leu Thr Arg Arg Leu Ala Gly Thr Phe Thr Trp Thr Leu
            260                 265                 270
```

```
Ser Asp Ser Gly Thr Glu Asn Pro Gly Gly Tyr Cys Leu Thr Lys
            275                 280                 285

Trp Met Leu Ile Ala Ala Glu Leu Lys Cys Phe Gly Asn Thr Ala Val
290                 295                 300

Ala Lys Cys Asn Ile Asn His Asp Glu Glu Phe Cys Asp Met Leu Arg
305                 310                 315                 320

Leu Ile Asp Tyr Asn Lys Ala Ala Leu Lys Lys Phe Lys Glu Asp Val
                325                 330                 335

Glu Ser Ala Leu His Leu Phe Lys Thr Val Asn Ser Leu Ile Ser
        340                 345                 350

Asp Gln Leu Leu Met Arg Asn His Leu Arg Asp Leu Met Gly Val Pro
        355                 360                 365

Tyr Cys Asn Tyr Ser Lys Phe Trp Tyr Leu Glu His Val Lys Thr Gly
    370                 375                 380

Asp Thr Ser Val Pro Lys Cys Trp Leu Val Ser Asn Gly Ser Tyr Leu
385                 390                 395                 400

Asn Glu Thr His Phe Ser Asp Gln Ile Glu Gln Glu Ala Asp Asn Met
                405                 410                 415

Ile Thr Glu Met Leu Arg Lys Asp Tyr Ile Lys Arg Gln Gly Ser Thr
            420                 425                 430

Pro Leu Ala Leu Met Asp Leu Leu Met Phe Ser Thr Ser Ala Tyr Leu
        435                 440                 445

Ile Ser Val Phe Leu His Leu Met Lys Ile Pro Thr His Arg His Ile
    450                 455                 460

Lys Gly Gly Thr Cys Pro Lys Pro His Arg Leu Thr Ser Lys Gly Ile
465                 470                 475                 480

Cys Ser Cys Gly Ala Phe Lys Val Pro Gly Val Lys Thr Val Trp Lys
                485                 490                 495

Arg Arg

<210> SEQ ID NO 3
<211> LENGTH: 1470
<212> TYPE: DNA
<213> ORGANISM: Mopeia virus

<400> SEQUENCE: 3
atggggcaga tagtcaccctt ctttcaagag gtgccacaca tccttgaaga agtgatgaac    60
attgtgctga tgaccctctc aatcttggcc atcctaaagg gcatctacaa tgtgatgacc   120
tgtggaatca tcggtttgat aacatttttg ttcttgtgtg ggagatcatg ctcaagcatc   180
tataaggaca actatgagtt cttctctctc gacctcgaca tgtcttcact gaatgcaacg   240
atgcctctct cctgctcaaa gaacaactcc atcactaca tccaagttgg gaatgagaca   300
ggcctagagc tgacattgac aaacactagc ataattgatc ataagttttg caacctgtct   360
gatgctcaca ggaggaatct ttatgacaaa gcacttatgt caatcttgac aacattccac   420
ctaagcattc cagattttaa ccaatatgag gcaatgtcat gtgattttaa cggagggaag   480
atctcaattc aatacaacct gtcccactca aattatgtgg atgccggcaa ccactgtggc   540
actattgcaa atggcattat ggatgttttt agaagaatgt attggagcac ctccctttcg   600
gttgcctctg acataagtgg gactcaatgc atacagaccg attataagta tttgattatt   660
cagaacacat catgggagga tcattgcatg ttctcaagac cctcacccat gggattttta   720
agccttctgt cacagagaac caggaattc tacatctcaa gaagacttt gggtcttttt   780 acatggactt tgagtgactc ggaagggaac gacatgccag gtggttactg tctcacaagg   840
```

-continued

```
tctatgctaa tagggcttga tctgaaatgc tttgggaaca ctgccattgc gaagtgtaat    900
caggcacatg atgaagaatt ctgtgacatg ctccgccttt ttgattttaa taaacaagca    960
attagcaaac tgaggtctga agttcagcag agcataaatt tgataaataa agctgtcaac   1020
gccctcatca atgatcaact ggtcatgagg aaccatttga gagatctaat gggtattcct   1080
tattgcaact actctaagtt ttggtacttg aatgatacta ggacagggag aacatccctc   1140
ccaaagtgtt ggcttgtgac caatgggtca tacctaaatg aaacccagtt ctcaacagaa   1200
attgagcaag aagccaataa catgttcact gacatgttga ggaaggagta tgagaaaagg   1260
cagagcacaa cacctctggg gttagtagat cttttttgttt tctccactag ctttttatttg  1320 atctccgtgt tcctccacct aatcaaaatt ccaacacata gacacataaa aggcaagcct   1380
tgcccgaaac cacacagact caatcacatg gcaatctgtt cctgtggctt ctataagcaa   1440
ccaggtctcc ccacacaatg gaaaaggtga                                   1470
```

<210> SEQ ID NO 4
<211> LENGTH: 489
<212> TYPE: PRT
<213> ORGANISM: Mopeia virus

<400> SEQUENCE: 4

```
Met Gly Gln Ile Val Thr Phe Phe Gln Glu Val Pro His Ile Leu Glu
1               5                   10                  15

Glu Val Met Asn Ile Val Leu Met Thr Leu Ser Ile Leu Ala Ile Leu
            20                  25                  30

Lys Gly Ile Tyr Asn Val Met Thr Cys Gly Ile Ile Gly Leu Ile Thr
        35                  40                  45

Phe Leu Phe Leu Cys Gly Arg Ser Cys Ser Ser Ile Tyr Lys Asp Asn
    50                  55                  60

Tyr Glu Phe Phe Ser Leu Asp Leu Asp Met Ser Ser Leu Asn Ala Thr
65                  70                  75                  80

Met Pro Leu Ser Cys Ser Lys Asn Asn Ser His His Tyr Ile Gln Val
                85                  90                  95

Gly Asn Glu Thr Gly Leu Glu Leu Thr Leu Thr Asn Thr Ser Ile Ile
            100                 105                 110

Asp His Lys Phe Cys Asn Leu Ser Asp Ala His Arg Arg Asn Leu Tyr
        115                 120                 125

Asp Lys Ala Leu Met Ser Ile Leu Thr Thr Phe His Leu Ser Ile Pro
    130                 135                 140

Asp Phe Asn Gln Tyr Glu Ala Met Ser Cys Asp Phe Asn Gly Gly Lys
145                 150                 155                 160

Ile Ser Ile Gln Tyr Asn Leu Ser His Ser Asn Tyr Val Asp Ala Gly
                165                 170                 175

Asn His Cys Gly Thr Ile Ala Asn Gly Ile Met Asp Val Phe Arg Arg
            180                 185                 190

Met Tyr Trp Ser Thr Ser Leu Ser Val Ala Ser Asp Ile Ser Gly Thr
        195                 200                 205

Gln Cys Ile Gln Thr Asp Tyr Lys Tyr Leu Ile Ile Gln Asn Thr Ser
    210                 215                 220

Trp Glu Asp His Cys Met Phe Ser Arg Pro Ser Pro Met Gly Phe Leu
225                 230                 235                 240

Ser Leu Leu Ser Gln Arg Thr Arg Asn Phe Tyr Ile Ser Arg Arg Leu
                245                 250                 255
```

```
Leu Gly Leu Phe Thr Trp Thr Leu Ser Asp Ser Glu Gly Asn Asp Met
            260                 265                 270
Pro Gly Gly Tyr Cys Leu Thr Arg Ser Met Leu Ile Gly Leu Asp Leu
        275                 280                 285
Lys Cys Phe Gly Asn Thr Ala Ile Ala Lys Cys Asn Gln Ala His Asp
    290                 295                 300
Glu Glu Phe Cys Asp Met Leu Arg Leu Phe Asp Phe Asn Lys Gln Ala
305                 310                 315                 320
Ile Ser Lys Leu Arg Ser Glu Val Gln Gln Ser Ile Asn Leu Ile Asn
                325                 330                 335
Lys Ala Val Asn Ala Leu Ile Asn Asp Gln Leu Val Met Arg Asn His
            340                 345                 350
Leu Arg Asp Leu Met Gly Ile Pro Tyr Cys Asn Tyr Ser Lys Phe Trp
        355                 360                 365
Tyr Leu Asn Asp Thr Arg Thr Gly Arg Thr Ser Leu Pro Lys Cys Trp
    370                 375                 380
Leu Val Thr Asn Gly Ser Tyr Leu Asn Glu Thr Gln Phe Ser Thr Glu
385                 390                 395                 400
Ile Glu Gln Glu Ala Asn Asn Met Phe Thr Asp Met Leu Arg Lys Glu
                405                 410                 415
Tyr Glu Lys Arg Gln Ser Thr Thr Pro Leu Gly Leu Val Asp Leu Phe
            420                 425                 430
Val Phe Ser Thr Ser Phe Tyr Leu Ile Ser Val Phe Leu His Leu Ile
        435                 440                 445
Lys Ile Pro Thr His Arg His Ile Lys Gly Lys Pro Cys Pro Lys Pro
    450                 455                 460
His Arg Leu Asn His Met Ala Ile Cys Ser Cys Gly Phe Tyr Lys Gln
465                 470                 475                 480
Pro Gly Leu Pro Thr Gln Trp Lys Arg
                485

<210> SEQ ID NO 5
<211> LENGTH: 1488
<212> TYPE: DNA
<213> ORGANISM: Ippy virus

<400> SEQUENCE: 5
atgggacaga taataacctt ctttcaggaa gtgcctcaca ttatagagga agtcatgaac      60
attgttctga tcaccctatc cctcttggct atcttgaagg gtgtgtacaa tgtcatgact     120
tgtggtctga ttggattgat ttcctttctc ttactgtgtg ggaagtcctg ctctctaatc     180
tacaaggaca catataactt ctcatccatt gaacttgacc tctcacacct caacatgaca     240
ttgcccatgt cctgcagccg aaacaactca caccactatg tcttcttcaa cggatctggc     300
ttagagatga cattcactaa cgattcactt cttaaccaca aattctgcaa tctttcagac     360
gcccataaaa agaatcttta cgatcatgcg ctaatgggca ttgtcacaac tttccacttg     420
tcaatcccga acttcaatca atacgaagca atggcctgtg acttcaatgg agggaatatt     480
agcattcaat acaacttgag ccacaatgat cgaacagatg caatgaacca ctgtggcact     540
gtagctaatg gtgtactgga tgcttttat aggttccatt ggggcagaaa ataacctac      600 atcgctcagt tgccaaatgg cgacggcact ggcagatgga cattctgtta tgccacaagt     660
tataagtacc tggttatcca aaacattagc tgggctgatc attgtcaaat gtcaagacca     720
actcccattg gctttgctag cattctgagc caacggatta ggagcattta catttcaaga     780
```

```
cgactgatga gcacattcac ttggtctcta tccgacagtt caggtactga gaatccaggt    840
ggctattgtc tcaccagatg gatgcttttt gcggctgact tgaaatgctt tggaaacaca    900
gccattgcca aatgtaacct gaatcatgat gaagagttct gcgacatgtt gaggcttatt    960
gacttcaaca agcaagcctt gaaaacattc aaatcggagg ttaaccatgg tctacaacta   1020
attacaaagg cgattaatgc cttgatcaat gaccaactca ttatgaagaa tcacttaagg   1080
gacctaatgg gtatccctta ttgcaattat tcaaaattct ggtatctaaa tgacacaaga   1140
acaggtagag tctctctgcc taagtgctgg atgatcagca acgggaccta tctaaatgag   1200
actcattttt ctgatgagat tgaacaggaa gcagacaata tgatcacaga aatgttgaga   1260
aaagagtatc aagaaagaca agggaagacc ccattgggtc tagttgatct ttttattttt   1320
agcacaagct tttattcaat cacagtgttc ctccatctca taaagattcc aacgcacaga   1380
cacatcgtgg acaagggtg tcccaagcca cacagactaa acagtagagc aatctgctcc   1440
tgtggtgcct ataaacagcc gggactaccc accaagtgga agcgctga                 1488

<210> SEQ ID NO 6
<211> LENGTH: 495
<212> TYPE: PRT
<213> ORGANISM: Ippy virus

<400> SEQUENCE: 6

Met Gly Gln Ile Ile Thr Phe Phe Gln Glu Val Pro His Ile Ile Glu
1               5                   10                  15

Glu Val Met Asn Ile Val Leu Ile Thr Leu Ser Leu Leu Ala Ile Leu
            20                  25                  30

Lys Gly Val Tyr Asn Val Met Thr Cys Gly Leu Ile Gly Leu Ile Ser
        35                  40                  45

Phe Leu Leu Leu Cys Gly Lys Ser Cys Ser Leu Ile Tyr Lys Asp Thr
    50                  55                  60

Tyr Asn Phe Ser Ser Ile Glu Leu Asp Leu Ser His Leu Asn Met Thr
65                  70                  75                  80

Leu Pro Met Ser Cys Ser Arg Asn Asn Ser His His Tyr Val Phe Phe
                85                  90                  95

Asn Gly Ser Gly Leu Glu Met Thr Phe Thr Asn Asp Ser Leu Leu Asn
            100                 105                 110

His Lys Phe Cys Asn Leu Ser Asp Ala His Lys Lys Asn Leu Tyr Asp
        115                 120                 125

His Ala Leu Met Gly Ile Val Thr Thr Phe His Leu Ser Ile Pro Asn
    130                 135                 140

Phe Asn Gln Tyr Glu Ala Met Ala Cys Asp Phe Asn Gly Gly Asn Ile
145                 150                 155                 160

Ser Ile Gln Tyr Asn Leu Ser His Asn Asp Arg Thr Asp Ala Met Asn
                165                 170                 175

His Cys Gly Thr Val Ala Asn Gly Val Leu Asp Ala Phe Tyr Arg Phe
            180                 185                 190

His Trp Gly Arg Asn Ile Thr Tyr Ile Ala Gln Leu Pro Asn Gly Asp
        195                 200                 205

Gly Thr Gly Arg Trp Thr Phe Cys Tyr Ala Thr Ser Tyr Lys Tyr Leu
    210                 215                 220

Val Ile Gln Asn Ile Ser Trp Ala Asp His Cys Gln Met Ser Arg Pro
225                 230                 235                 240

Thr Pro Ile Gly Phe Ala Ser Ile Leu Ser Gln Arg Ile Arg Ser Ile
                245                 250                 255
```

| Tyr | Ile | Ser | Arg | Arg | Leu | Met | Ser | Thr | Phe | Thr | Trp | Ser | Leu | Ser | Asp |
|  | 260 |  |  |  |  | 265 |  |  |  | 270 |  |  |  |  |  |

| Ser | Ser | Gly | Thr | Glu | Asn | Pro | Gly | Gly | Tyr | Cys | Leu | Thr | Arg | Trp | Met |
| 275 |  |  |  |  | 280 |  |  |  |  | 285 |  |  |  |  |  |

| Leu | Phe | Ala | Ala | Asp | Leu | Lys | Cys | Phe | Gly | Asn | Thr | Ala | Ile | Ala | Lys |
| 290 |  |  |  |  | 295 |  |  |  |  | 300 |  |  |  |  |  |

| Cys | Asn | Leu | Asn | His | Asp | Glu | Glu | Phe | Cys | Asp | Met | Leu | Arg | Leu | Ile |
| 305 |  |  |  |  | 310 |  |  |  |  | 315 |  |  |  |  | 320 |

| Asp | Phe | Asn | Lys | Gln | Ala | Leu | Lys | Thr | Phe | Lys | Ser | Glu | Val | Asn | His |
|  |  |  |  | 325 |  |  |  |  | 330 |  |  |  |  | 335 |  |

| Gly | Leu | Gln | Leu | Ile | Thr | Lys | Ala | Ile | Asn | Ala | Leu | Ile | Asn | Asp | Gln |
|  |  |  |  | 340 |  |  |  |  | 345 |  |  |  |  | 350 |  |

| Leu | Ile | Met | Lys | Asn | His | Leu | Arg | Asp | Leu | Met | Gly | Ile | Pro | Tyr | Cys |
|  |  |  | 355 |  |  |  |  | 360 |  |  |  |  | 365 |  |  |

| Asn | Tyr | Ser | Lys | Phe | Trp | Tyr | Leu | Asn | Asp | Thr | Arg | Thr | Gly | Arg | Val |
|  | 370 |  |  |  |  | 375 |  |  |  |  | 380 |  |  |  |  |

| Ser | Leu | Pro | Lys | Cys | Trp | Met | Ile | Ser | Asn | Gly | Thr | Tyr | Leu | Asn | Glu |
| 385 |  |  |  |  | 390 |  |  |  |  | 395 |  |  |  |  | 400 |

| Thr | His | Phe | Ser | Asp | Glu | Ile | Glu | Gln | Glu | Ala | Asp | Asn | Met | Ile | Thr |
|  |  |  |  | 405 |  |  |  |  | 410 |  |  |  |  | 415 |  |

| Glu | Met | Leu | Arg | Lys | Glu | Tyr | Gln | Glu | Arg | Gln | Gly | Lys | Thr | Pro | Leu |
|  |  |  | 420 |  |  |  |  | 425 |  |  |  |  | 430 |  |  |

| Gly | Leu | Val | Asp | Leu | Phe | Ile | Phe | Ser | Thr | Ser | Phe | Tyr | Ser | Ile | Thr |
|  |  | 435 |  |  |  |  | 440 |  |  |  |  | 445 |  |  |  |

| Val | Phe | Leu | His | Leu | Ile | Lys | Ile | Pro | Thr | His | Arg | His | Ile | Val | Gly |
|  | 450 |  |  |  |  | 455 |  |  |  |  | 460 |  |  |  |  |

| Gln | Gly | Cys | Pro | Lys | Pro | His | Arg | Leu | Asn | Ser | Arg | Ala | Ile | Cys | Ser |
| 465 |  |  |  |  | 470 |  |  |  |  | 475 |  |  |  |  | 480 |

| Cys | Gly | Ala | Tyr | Lys | Gln | Pro | Gly | Leu | Pro | Thr | Lys | Trp | Lys | Arg |
|  |  |  |  | 485 |  |  |  |  | 490 |  |  |  |  | 495 |

<210> SEQ ID NO 7
<211> LENGTH: 1548
<212> TYPE: DNA
<213> ORGANISM: Latino virus

<400> SEQUENCE: 7

```
atgggtcaag tgattggatt cttccaatca ttgcccgaga ttattaatga agcgttgaac      60
attgctctga tctgtgtggc tctgcttgcc acaatcaagg gaatggtcaa catctggaaa     120
tctggtttga tacagctcct cttcttcctc acattggcag gaagaagttg ttctcattct     180
tttacaattg gaagatttca tgaatttcag agtgtgacag ttaactttac acagttcatg     240
tcctatgctc aagctcttg ctcagtaaac aacacccacc attatttcaa aggtccccaa     300
aacaccacct gggtcttga gttgactttg actaatgaat caatgataaa catcaccaat     360
tccatgaggg tcttcactaa cattcatcac aatgtaacca attgcgtgca gaacatttcc     420
gaacatgagg gtgtgctcaa atggctgctt gagacaatgc acctaagcat cagcaagcca     480
ggaaaacaca tcgcacctgt catgtgtgag agacaaaagg ggttgctcat cgagtacaat     540
ctcactatga ccaaagacca ccacccaaat tattggaatc aagtcttgta tggactggct     600
aaattattgg ctcaagtaa gcgtttgtgg tttggcgcat gtaacaaggc tgactgtcag     660
atgcaatcag accaccagca cataaaatgc aattactcga attgcaaagg ttacaccagc     720
tttaaatact aattattca aaataccact tgggaaaacc attgtgagta taaccatctg     780
```

```
aacaccatcc accttctcat gagctctatt ggccaatcct ttatcacaag aaggcttcaa      840
gcctttttaa cctggacact ttctgatgca ctagggaatg accttcctgg gggatactgt      900
cttgaacagt gggctgtggt gtggtttggc ataaagtgtt ttgataacac agcaatggcc      960
aagtgcaatc agaatcatga ttcagagttt tgtgatatgc taaggctttt tgattacaat     1020
agaaatgcta ttcagagctt aaatgatcaa tctcaagcca gattaaacct tttaactaac     1080
accattaatt cacttgtctc tgacaattta ctaatgaaaa ataagctaag agaactaatg     1140
aacgtgccat actgtaatta cactagattc tggtttatta atgatacaaa gaatggtaga     1200
cacactcttc acaatgttg gttggtatca gatggttcgt acttgaatga aaccagattc      1260
agaactcaat ggctaagtga agtaactct ttatacacag aaatgctgac tgaagaatat      1320
gaaaaaagac agggtagaac acctctttct ttagtggacc tatgcttttg gtcaactctc     1380
ttttacatat caacattatt tgcgcattta gtgggtttcc caactcacag acaccttata     1440
ggtgagggct gcccaaaacc acacagatta acagggtcag ggatctgctc atgtggacat     1500
tatggtattc caggtaaacc agtcagatgg acaaagatgt caaggtga                 1548
```

<210> SEQ ID NO 8
<211> LENGTH: 515
<212> TYPE: PRT
<213> ORGANISM: Latino virus

<400> SEQUENCE: 8

```
Met Gly Gln Val Ile Gly Phe Phe Gln Ser Leu Pro Glu Ile Ile Asn
1               5                   10                  15

Glu Ala Leu Asn Ile Ala Leu Ile Cys Val Ala Leu Leu Ala Thr Ile
            20                  25                  30

Lys Gly Met Val Asn Ile Trp Lys Ser Gly Leu Ile Gln Leu Leu Phe
        35                  40                  45

Phe Leu Thr Leu Ala Gly Arg Ser Cys Ser His Ser Phe Thr Ile Gly
    50                  55                  60

Arg Phe His Glu Phe Gln Ser Val Thr Val Asn Phe Thr Gln Phe Met
65                  70                  75                  80

Ser Tyr Ala Pro Ser Ser Cys Ser Val Asn Asn Thr His His Tyr Phe
                85                  90                  95

Lys Gly Pro Gln Asn Thr Thr Trp Gly Leu Glu Leu Thr Leu Thr Asn
            100                 105                 110

Glu Ser Met Ile Asn Ile Thr Asn Ser Met Arg Val Phe Thr Asn Ile
        115                 120                 125

His His Asn Val Thr Asn Cys Val Gln Asn Ile Ser Glu His Glu Gly
    130                 135                 140

Val Leu Lys Trp Leu Leu Glu Thr Met His Leu Ser Ile Ser Lys Pro
145                 150                 155                 160

Gly Lys His Ile Ala Pro Val Met Cys Glu Arg Gln Lys Gly Leu Leu
                165                 170                 175

Ile Glu Tyr Asn Leu Thr Met Thr Lys Asp His His Pro Asn Tyr Trp
            180                 185                 190

Asn Gln Val Leu Tyr Gly Leu Ala Lys Leu Leu Gly Ser Ser Lys Arg
        195                 200                 205

Leu Trp Phe Gly Ala Cys Asn Lys Ala Asp Cys Gln Met Gln Ser Asp
    210                 215                 220

His Gln His Ile Lys Cys Asn Tyr Ser Asn Cys Lys Gly Tyr Thr Ser
225                 230                 235                 240
```

```
Phe Lys Tyr Leu Ile Ile Gln Asn Thr Thr Trp Glu Asn His Cys Glu
                245                 250                 255

Tyr Asn His Leu Asn Thr Ile His Leu Leu Met Ser Ser Ile Gly Gln
            260                 265                 270

Ser Phe Ile Thr Arg Arg Leu Gln Ala Phe Leu Thr Trp Thr Leu Ser
        275                 280                 285

Asp Ala Leu Gly Asn Asp Leu Pro Gly Gly Tyr Cys Leu Glu Gln Trp
    290                 295                 300

Ala Val Val Trp Phe Gly Ile Lys Cys Phe Asp Asn Thr Ala Met Ala
305                 310                 315                 320

Lys Cys Asn Gln Asn His Asp Ser Glu Phe Cys Asp Met Leu Arg Leu
                325                 330                 335

Phe Asp Tyr Asn Arg Asn Ala Ile Gln Ser Leu Asn Asp Gln Ser Gln
            340                 345                 350

Ala Arg Leu Asn Leu Leu Thr Asn Thr Ile Asn Ser Leu Val Ser Asp
        355                 360                 365

Asn Leu Leu Met Lys Asn Lys Leu Arg Glu Leu Met Asn Val Pro Tyr
    370                 375                 380

Cys Asn Tyr Thr Arg Phe Trp Phe Ile Asn Asp Thr Lys Asn Gly Arg
385                 390                 395                 400

His Thr Leu Pro Gln Cys Trp Leu Val Ser Asp Gly Ser Tyr Leu Asn
                405                 410                 415

Glu Thr Arg Phe Arg Thr Gln Trp Leu Ser Glu Ser Asn Ser Leu Tyr
            420                 425                 430

Thr Glu Met Leu Thr Glu Glu Tyr Glu Lys Arg Gln Gly Arg Thr Pro
        435                 440                 445

Leu Ser Leu Val Asp Leu Cys Phe Trp Ser Thr Leu Phe Tyr Ile Ser
    450                 455                 460

Thr Leu Phe Ala His Leu Val Gly Phe Pro Thr His Arg His Leu Ile
465                 470                 475                 480

Gly Glu Gly Cys Pro Lys Pro His Arg Leu Thr Gly Ser Gly Ile Cys
                485                 490                 495

Ser Cys Gly His Tyr Gly Ile Pro Gly Lys Pro Val Arg Trp Thr Lys
            500                 505                 510

Met Ser Arg
        515
```

<210> SEQ ID NO 9
<211> LENGTH: 1557
<212> TYPE: DNA
<213> ORGANISM: Oliveros virus

<400> SEQUENCE: 9

```
atgggtcaag tcattgggtt cttccaatcc ttacccaaca tcattaatga ggcactaaac     60
attgccctca tctgtgtggc attaattgcc atattgaaag gtattgttaa catatggaaa    120
tcaggtctga ttcagctgtt catattcctc atcctagcgg ggaggagctg ttctcacacc    180
tttcagattg gccgaaacca tgagttccaa agtatcactc taaacttcac acagtttttg    240
ggctacgcac ccagctcctg ttctgttaac aacactcatc actactttag aggtcctggc    300
aatgtctctt ggggcatcga gctcacattg accaacaact ccgtgatcaa tgcaagcaac    360
tcactgaagg tgttcaccaa cattcaccac aacatcacca actgcgttca gaatatcgat    420
gagcaagacc acctaatgaa atggctcata gaaacaatgc atctacagat catgaaacca    480
```

-continued

```
ggaaagagac taccaccaat cctgtgtgag aaagacaaag ggttactaat tgaatacaac    540
ctaaccaaca ttgcatctcg cgaagaaaag cactctgagt actggagcca acttctctat    600
ggtctatcaa aactattagg ctccagtaag tcattgtggt ttgattactg tcagagagca    660
gattgcatga tgcaagagca cagctcacac ttgaagtgca actactcaga gtgttctggc    720
cataccacct tcaaatacct cattctacaa aacaccactt gggagaacca ttgtgagttc    780
aaccatctaa acacaattca cctgttgatg agctctactg gtcagtcttt cataactaga    840
aggttgcagg cttttctaac ttggactttg tcagatgcta caggcaatga cctccctggg    900
ggttactgcc tagagcagtg ggccatagtt tgggcaggca tcaagtgctt tgggaacaca    960
gcagttgcaa agtgtaatca aaatcatgac tctgaattct gtgacatgtt gaggctcttt    1020
gattacaata ggaatgctat taagagtctg aatgatcagt ctcaaagtcg tctaaatctt    1080
ctaacaaata caataaattc actgatttcg gataatctgt tgatgaaaaa caagttggct    1140
gagataatga acattccgta ttgcaattac acaaaattct ggtacatcaa cgacactagg    1200
actggaaggc acacccttcc ccaatgctgg ttaatctcaa atgggtctta cttgaatgag    1260
actaaattca gaactcagtg gctgtcagag agcaatgcac tctatacaga aatgctaaca    1320
gaagattatg acaaaaggca gggtagcaca ccactctcct tggttgatct atgttttttgg   1380
tcaaccttat tctatgtgac cacattgttt gctcatcttg ttggtttccc aacacacaga    1440
cacatcttag atggtccttg ccctaaaccc cacagattaa caaagaaagg aatttgttcc    1500
tgtggacatt ttggaatacc gggcaaacct gttcgatggg tgaaacgatc acggtga      1557
```

<210> SEQ ID NO 10
<211> LENGTH: 518
<212> TYPE: PRT
<213> ORGANISM: Oliveros virus

<400> SEQUENCE: 10

```
Met Gly Gln Val Ile Gly Phe Phe Gln Ser Leu Pro Asn Ile Ile Asn
1               5                   10                  15

Glu Ala Leu Asn Ile Ala Leu Ile Cys Val Ala Leu Ile Ala Ile Leu
            20                  25                  30

Lys Gly Ile Val Asn Ile Trp Lys Ser Gly Leu Ile Gln Leu Phe Ile
        35                  40                  45

Phe Leu Ile Leu Ala Gly Arg Ser Cys Ser His Thr Phe Gln Ile Gly
    50                  55                  60

Arg Asn His Glu Phe Gln Ser Ile Thr Leu Asn Phe Thr Gln Phe Leu
65                  70                  75                  80

Gly Tyr Ala Pro Ser Ser Cys Ser Val Asn Asn Thr His His Tyr Phe
                85                  90                  95

Arg Gly Pro Gly Asn Val Ser Trp Gly Ile Glu Leu Thr Leu Thr Asn
            100                 105                 110

Asn Ser Val Ile Asn Ala Ser Asn Ser Leu Lys Val Phe Thr Asn Ile
        115                 120                 125

His His Asn Ile Thr Asn Cys Val Gln Asn Ile Asp Glu Gln Asp His
    130                 135                 140

Leu Met Lys Trp Leu Ile Glu Thr Met His Leu Gln Ile Met Lys Pro
145                 150                 155                 160

Gly Lys Arg Leu Pro Pro Ile Leu Cys Glu Lys Asp Lys Gly Leu Leu
                165                 170                 175

Ile Glu Tyr Asn Leu Thr Asn Ile Ala Ser Arg Glu Glu Lys His Ser
            180                 185                 190
```

```
Glu Tyr Trp Ser Gln Leu Leu Tyr Gly Leu Ser Lys Leu Leu Gly Ser
            195                 200                 205

Ser Lys Ser Leu Trp Phe Asp Tyr Cys Gln Arg Ala Asp Cys Met Met
        210                 215                 220

Gln Glu His Ser His Leu Lys Cys Asn Tyr Ser Glu Cys Ser Gly
225                 230                 235                 240

His Thr Thr Phe Lys Tyr Leu Ile Leu Gln Asn Thr Thr Trp Glu Asn
            245                 250                 255

His Cys Glu Phe Asn His Leu Asn Thr Ile His Leu Leu Met Ser Ser
                260                 265                 270

Thr Gly Gln Ser Phe Ile Thr Arg Arg Leu Gln Ala Phe Leu Thr Trp
            275                 280                 285

Thr Leu Ser Asp Ala Thr Gly Asn Asp Leu Pro Gly Gly Tyr Cys Leu
            290                 295                 300

Glu Gln Trp Ala Ile Val Trp Ala Gly Ile Lys Cys Phe Gly Asn Thr
305                 310                 315                 320

Ala Val Ala Lys Cys Asn Gln Asn His Asp Ser Glu Phe Cys Asp Met
                325                 330                 335

Leu Arg Leu Phe Asp Tyr Asn Arg Asn Ala Ile Lys Ser Leu Asn Asp
            340                 345                 350

Gln Ser Gln Ser Arg Leu Asn Leu Leu Thr Asn Thr Ile Asn Ser Leu
            355                 360                 365

Ile Ser Asp Asn Leu Leu Met Lys Asn Lys Leu Ala Glu Ile Met Asn
            370                 375                 380

Ile Pro Tyr Cys Asn Tyr Thr Lys Phe Trp Tyr Ile Asn Asp Thr Arg
385                 390                 395                 400

Thr Gly Arg His Thr Leu Pro Gln Cys Trp Leu Ile Ser Asn Gly Ser
            405                 410                 415

Tyr Leu Asn Glu Thr Lys Phe Arg Thr Gln Trp Leu Ser Glu Ser Asn
            420                 425                 430

Ala Leu Tyr Thr Glu Met Leu Thr Glu Asp Tyr Asp Lys Arg Gln Gly
            435                 440                 445

Ser Thr Pro Leu Ser Leu Val Asp Leu Cys Phe Trp Ser Thr Leu Phe
450                 455                 460

Tyr Val Thr Thr Leu Phe Ala His Leu Val Gly Phe Pro Thr His Arg
465                 470                 475                 480

His Ile Leu Asp Gly Pro Cys Pro Lys Pro His Arg Leu Thr Lys Lys
                485                 490                 495

Gly Ile Cys Ser Cys Gly His Phe Gly Ile Pro Gly Lys Pro Val Arg
                500                 505                 510

Trp Val Lys Arg Ser Arg
            515
```